(12) United States Patent
Jeon et al.

(10) Patent No.: US 10,725,353 B2
(45) Date of Patent: Jul. 28, 2020

(54) DISPLAY DEVICE

(71) Applicant: Samsung Display Co., Ltd., Yongin-Si, Gyeonggi-Do (KR)

(72) Inventors: Heechul Jeon, Hwaseong-si (KR); Taekyung Yim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 106 days.

(21) Appl. No.: 15/643,941

(22) Filed: Jul. 7, 2017

(65) Prior Publication Data

US 2018/0074358 A1 Mar. 15, 2018

(30) Foreign Application Priority Data

Sep. 13, 2016 (KR) .................. 10-2016-0117897

(51) Int. Cl.
- G02F 1/1345 (2006.01)
- G02F 1/1333 (2006.01)
- G02F 1/1335 (2006.01)
- G02F 1/1339 (2006.01)

(52) U.S. Cl.
CPC ...... G02F 1/13458 (2013.01); G02F 1/13338 (2013.01); G02F 1/133305 (2013.01); *G02F 1/13394* (2013.01); *G02F 2001/133388* (2013.01); *G02F 2001/133548* (2013.01); *G02F 2201/50* (2013.01)

(58) Field of Classification Search
CPC ........... G02F 1/13458; G02F 1/133305; G02F 1/13338; G02F 1/13394; G02F 2201/50; G02F 2201/133388
See application file for complete search history.

(56) References Cited

U.S. PATENT DOCUMENTS

| 2009/0115738 A1* | 5/2009 | Chueh | G02F 1/133308 345/173 |
|---|---|---|---|
| 2010/0032191 A1* | 2/2010 | Lo | H05K 1/0281 174/254 |
| 2011/0115961 A1* | 5/2011 | Moriyama | H01L 27/3248 348/333.01 |
| 2011/0193478 A1* | 8/2011 | Kim | H05K 1/189 315/32 |
| 2014/0085279 A1* | 3/2014 | Shiomi | G09G 3/2074 345/204 |
| 2014/0306348 A1* | 10/2014 | Ahn | H01L 23/4985 257/773 |

(Continued)

FOREIGN PATENT DOCUMENTS

| KR | 1020150006706 A | 1/2015 |
| KR | 1020150019380 A | 2/2015 |
| KR | 1020150026709 A | 3/2015 |

*Primary Examiner* — Ariel A Balaoing
(74) *Attorney, Agent, or Firm* — Cantor Colburn LLP

(57) ABSTRACT

A display device includes a display part which displays an image, a pad part electrically connected to the display part, and a bending part disposed between the display part and the pad part to connect the display part and the pad part, where the bending part has a side end extending from the display part to the pad part. The bending part includes a base layer, a plurality of wires disposed on the base layer and electrically connected to the display part and the pad part, and a pattern part disposed between the side end and the plurality of wires when viewed from a plan view.

20 Claims, 19 Drawing Sheets

(56) References Cited

U.S. PATENT DOCUMENTS

| | | | |
|---|---|---|---|
| 2015/0042598 A1* | 2/2015 | Chae | G06F 3/041 |
| | | | 345/174 |
| 2016/0035759 A1* | 2/2016 | Kwon | H01L 27/1244 |
| | | | 257/40 |
| 2016/0124557 A1* | 5/2016 | Choi | G06F 3/0412 |
| | | | 345/173 |
| 2017/0202094 A1* | 7/2017 | Kim | H04B 1/3888 |

\* cited by examiner

DISPLAY DEVICE

This application claims priority to Korean Patent Application No. 10-2016-0117897, filed on Sep. 13, 2016, the content of which in its entirety is herein incorporated by reference.

BACKGROUND

1. Field

The disclosure herein relates to a display device, and more particularly, to a display device with improved reliability and manufacturing yield.

2. Description of the Related Art

A display device typically includes a display panel and a printed circuit board for providing a signal to drive the display panel. The display panel and the printed circuit board may be directly connected to each other or may be electrically connected to each other through a tape carrier package that connects the display panel and the printed circuit board. The printed circuit board may be disposed at the rear of the display panel. Accordingly, one of the display panel, the printed circuit board, or the tape carrier package may be bendable.

SUMMARY

The disclosure provides a display device with improved reliability and manufacturing yield.

An embodiment of the invention provides a display device including: a display part configured to display an image; a pad part electrically connected to the display part; and a bending part disposed between the display part and the pad part to connect the display part and the pad part, where the bending part has a side end extending from the display part to the pad part. In such an embodiment, the bending part includes: a base layer; a plurality of wires disposed on the base layer and electrically connected to the display part and the pad part; and a pattern part disposed between the side end and the plurality of wires when viewed from a plan view.

In an embodiment, the pattern part may overlap the side end when viewed from the plan view.

In an embodiment, the pattern part may be spaced from the side end when viewed from the plan view.

In an embodiment, the side end may extend along a first direction, and the pattern part may include a pattern extending along the first direction.

In an embodiment, the pattern may be provided in plurality, and the plurality of patterns may be arranged along a second direction intersecting the first direction.

In an embodiment, the side end may extend along a first direction, the pattern part may include a plurality of patterns, and the plurality of patterns may be arranged in a matrix form along the first direction and a second direction intersecting the first direction.

In an embodiment, the side end may extend along a first direction, and the pattern part may include a plurality of first patterns arranged along the first direction and a plurality of second patterns arranged along the first direction, and the first patterns and the second patterns may be alternately arranged along a second direction intersecting the first direction, and an imaginary line passing through a center point of each of the first patterns and extending along the second direction may be spaced apart from a center point of each of the second patterns.

In an embodiment, the bending part may include: a first organic layer disposed on the base layer, and a second organic layer disposed on the first organic layer, where the pattern part may be disposed between the first organic layer and the second organic layer.

In an embodiment, the pattern part may include a first pattern layer and a second pattern layer disposed on the first pattern layer, and the bending part may further include a third organic layer disposed between the first pattern layer and the second pattern layer.

In an embodiment, the pattern part may further include a first pattern layer and a second pattern layer disposed on the first pattern layer, and the first pattern layer and the second pattern layer may contact each other.

In an embodiment, the display part may include: a driving transistor including a semiconductor pattern, a control electrode, an input electrode, and an output electrode; an anode electrically connected to the output electrode; and a plurality of insulation layers, each of which is disposed between the semiconductor pattern, the control electrode, and the input and output electrodes, where each of the plurality of insulation layers may include an inorganic matter.

In an embodiment, the pattern part may include a same material as the control electrode.

In an embodiment, the pattern part may include a same material as the input electrode and the output electrode.

In an embodiment, the pattern part may include a same material as the anode.

In an embodiment, the pattern part may include the same material as each of the plurality of insulation layers.

In an embodiment, the display device may further include: a buffer layer disposed on the display part; and a touch detection unit disposed on the buffer layer, wherein the pattern part may include a same material as the buffer layer or the touch detection unit.

In an embodiment, the pattern part may include a plurality of pattern layers; and each of the plurality of patterns may include a same material as at least one of the control electrode, the input electrode, the output electrode, the anode, the plurality of insulation layers, the buffer layer and the touch detection unit.

In an embodiment, the pattern part may include an inorganic matter or a metallic material.

In an embodiment, the display part, the bending part and the pad part may be sequentially arranged along a first direction, the display part may have a first width parallel to a second direction intersecting the first direction, the bending part may have a second width parallel to the second direction, and the second width may be less than the first width.

In an embodiment, the bending part may be bent toward a bottom surface of the display part, and the pad part may be disposed below the display part.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
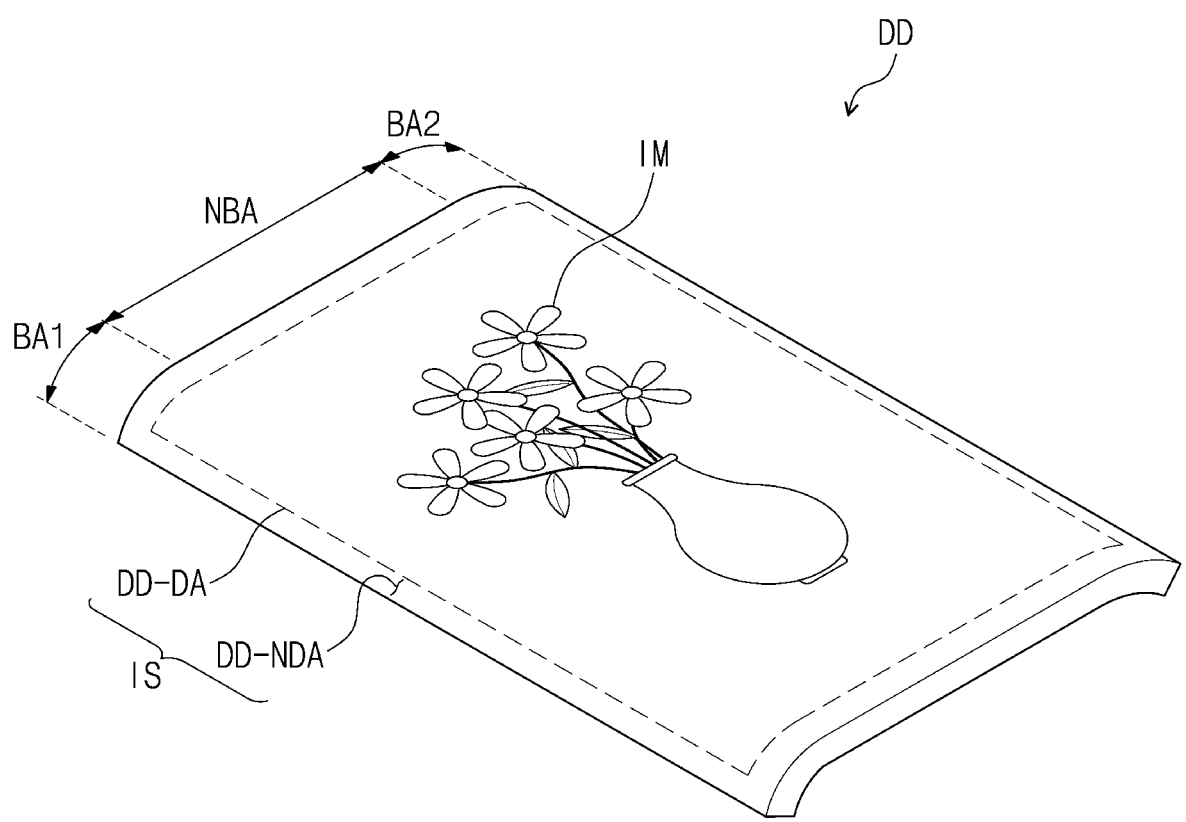
FIG. 1 is a perspective view of a display device according to an embodiment of the invention.
Figure 1:
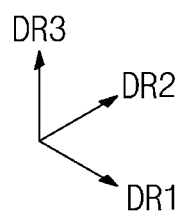

Various modifications are possible in various embodiments of the invention and specific embodiments are illustrated in drawings and related detailed descriptions are listed. However, this does not limit various embodiments of the disclosure to a specific embodiment and it should be understood that the disclosure covers all the modifications, equivalents, and/or replacements of this disclosure provided they come within the scope of the appended claims and their equivalents.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the invention. The singular forms 'a,' 'an,' and 'the' include plural reference unless the context clearly dictates otherwise.

In addition, terms such as "below", "the lower side", "on", and "the upper side" are used to describe a relationship of configurations shown in the drawing. The terms are described as a relative concept based on a direction shown in the drawing.

In various embodiments of the invention, the term "include," "comprise," "including," or "comprising," specifies a property, a region, a fixed number, a step, a process, an element and/or a component but does not exclude other properties, regions, fixed numbers, steps, processes, elements and/or components.

FIG. 1 is a perspective view of a display device DD according to an embodiment of the invention.

Referring to FIG. 1, an exemplary embodiment of a display device DD may have bending areas BA1 and BA2, but not being limited thereto. Alternatively, embodiments of the invention may relate to a flat display device, a foldable display device, a rollable display device and is not particularly limited thereto. The display device DD may be included in or used for small and medium-sized electronic devices such as mobile phones, tablets, car navigations, game consoles, and smart watches in addition to large-sized electronic devices such as televisions and monitors.

In an embodiment, the display device DD may include a display surface IS where an image IM is displayed, which is substantially parallel to a plane defined by a first direction DR1 and a second direction DR2. The display surface IS of the display device DD may include a plurality of areas. The display device DD may include a display area DD-DA where an image IM is displayed and a non-display area DD-NDA adjacent to the display area DD-DA. The non-display area DD-NDA is an area where no image is displayed. FIG. 1 illustrates a vase as an example of the image IM displayed on the display area DD-DA.

The display area DD-DA may have a substantially rectangular form. The non-display area DD-NDA may surround the display area DD-DA. However, embodiments of the invention are not limited thereto, and a form of the display area DD-DA and a form of the non-display area DD-NDA may be variously modified.

The display device DD includes a non-bending area (or a flat area or a non-curved area) NBA where a main image is displayed on a front surface and bending areas (or side surface areas or curved areas) BA1 and BA2 where main and sub images are displayed on a side surface. Although not shown in the drawing separately, the sub image may include an icon for providing predetermined information. According to an embodiment, the terms "non-bending area NBA" and "bending areas BA1 and BA2" define the display device DD with a plurality of areas divided based on a shape thereof.

FIG. 1 exemplarily illustrates an embodiment where the display device DD has the bending areas BA1 and BA2 extending and bending from opposing side ends of the non-bending area NBA. However, embodiments of the invention are not limited thereto, and the display device DD may include the non-bending area NBA and only a single bending area bending from one side end of the non-bending area NBA.

Figure 2:
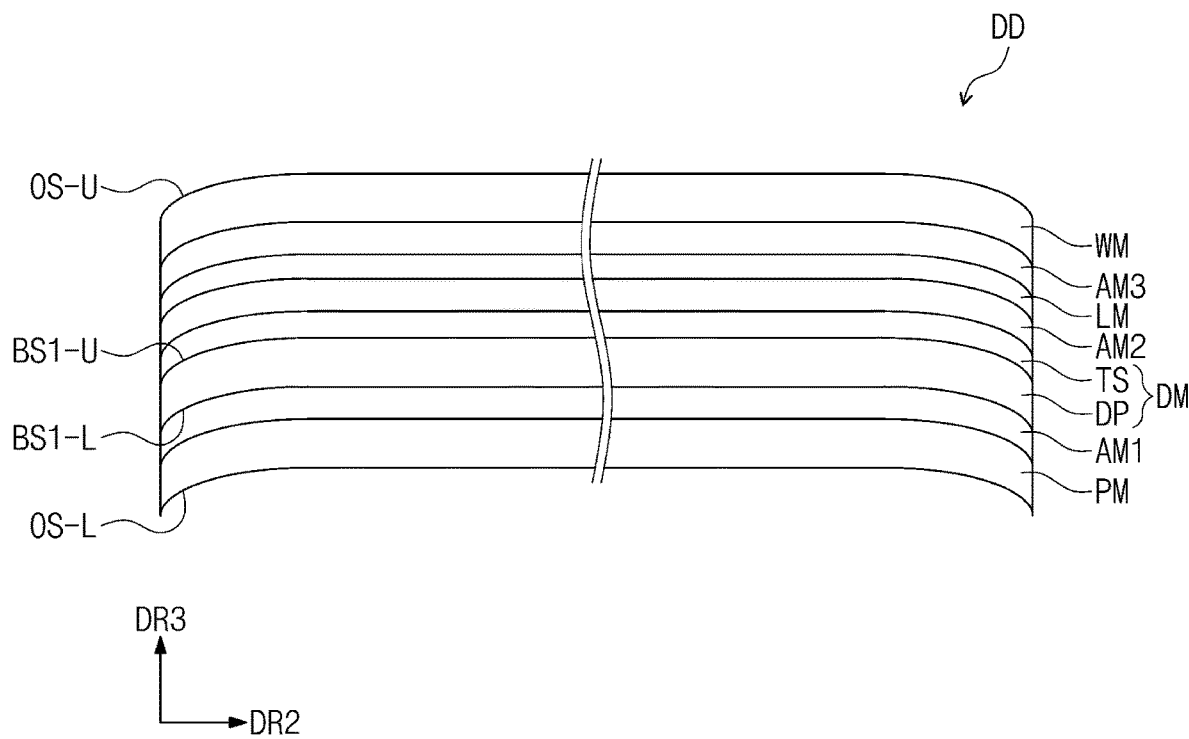
FIG. 2 is a cross-sectional view of a display device according to an embodiment of the invention.

FIG. 2 is a cross-sectional view of a display device DD according to an embodiment of the invention. FIG. 2 shows a cross-section taken by a plane defined by a second direction DR2 and a third direction DR3.

Referring to FIG. 2, an embodiment of the display device DD includes a protective film PM, a display module DM, an optical member LM, a window WM, a first adhesive member AM1, a second adhesive member AM2, and a third adhesive member AM3. The display module DM is disposed between the protective film PM and the optical member LM. The optical member LM is disposed between the display module DM and the window WM. The first adhesive member AM1 couples or attached the display module DM and the protective film PM to each other, the second adhesive member AM2 couples or attached the display module DM and the optical member LM to each other, and the third adhesive member AM3 couples or attached the optical member LM and the window WM to each other.

The protective film PM protects the display module DM. A surface (e.g., a lower surface or an opposing surface) of the protective film PM defines a first opposing surface OS-L of the display device DD, which is exposed to the outside, and an opposing surface (e.g., an upper surface or an internal surface) of the protective film PM provides an adhesive surface adhered to the first adhesive member AM1. The protective film PM effectively prevents external moisture from penetrating the display module DM and absorbs external impact.

The protective film PM may include a plastic film as a base substrate. The protective film PM may include a plastic film including at least one selected from polyethersulfone ("PES"), polyacrylate, polyetherimide ("PEI"), polyethylenenaphthalate ("PEN"), polyethyleneterephthalate ("PET"), polyphenylene sulfide ("PPS"), polyarylate, polyimide ("PI"), polycarbonate ("PC"), poly(arylene ethersulfone), and a combination thereto.

However, the material of the protective film PM is not limited to plastic resins, and the protective film PM may include an organic/inorganic composite material. The protective film PM may include an inorganic material filled in pores of a porous organic layer and an organic layer. The protective film PM may further include a functional layer on a plastic film. The functional layer may include a resin layer. The functional layer may be provided or formed through a coating method. According to an alternative embodiment of the invention, the protective film PM may be omitted.

The window WM may protect the display module DM from an external impact and provide an input surface to a user. A surface (e.g., an upper surface of an opposing surface) of the window WM defines a second opposing surface OS-U of the display device DD, which is exposed to the outside, and an opposing surface (e.g., a lower surface or an internal surface) of the window WM provides an adhesive surface adhered to the third adhesive member AM3. The display surface IS shown in FIG. 1 may be the second opposing surface OS-U.

The window WM may include a plastic film. The window WM may have a multilayer structure. The window WM may have a multilayer structure including a glass substrate, a plastic film, or a plastic substrate. The window WM may further include a bezel pattern. The multilayer structure may be provided or formed through a continuous process or an adhering process using an adhesive layer.

The optical member LM reduces an external light reflectance. The optical member LM may include at least a polarizing film. The optical member LM may further include a phase difference film. According to an alternative embodiment of the invention, the optical member LM may be omitted.

The display module DM may include a display panel DP and a touch detection unit TS. In an embodiment, the touch detection unit TS may be directly disposed on the display panel DP. Herein, "directly disposed" means "being formed" through a continuous process, excluding "attached" through an additional adhesive layer. However, this is merely exemplary, and alternatively, the touch detection unit TS may be disposed on the thin film sealing layer TFE after formed on a film or a substrate.

The display panel DP generates or output the image IM (see FIG. 1) corresponding to inputted image data. The display panel DP provides a first display panel surface BS1-L and a second display panel surface BS1-U opposite to each other in a thickness direction DR3.

The touch detection unit TS obtains position or coordinate information of an external input or a touch on the display device DD. In an embodiment, the touch detection unit TS may detect the external input through a capacitance method.

In an embodiment, the display module DM may further include an anti-reflective layer (not shown). The anti-reflective layer may include a color filter or a layer-stacked structure of conductive layer/insulation layer/conductive layer. The anti-reflective layer may reduce an external light reflectance by absorbing, destructive-interfering, or polarizing the light incident from the outside. The anti-reflective layer may replace a function of the optical member LM.

In an embodiment, each of the first adhesive member AM1, the second adhesive member AM2, and the third adhesive member AM3 may be an organic adhesive layer such as an optically clear adhesive ("OCA") film, optically clear resin ("OCR"), or a pressure sensitive adhesive ("PSA") film. The organic adhesive layer may include an adhesive material such as a polyurethane, polyacrylic, polyester, polyepoxy, or polyvinyl acetate, for example.

Figure 3:
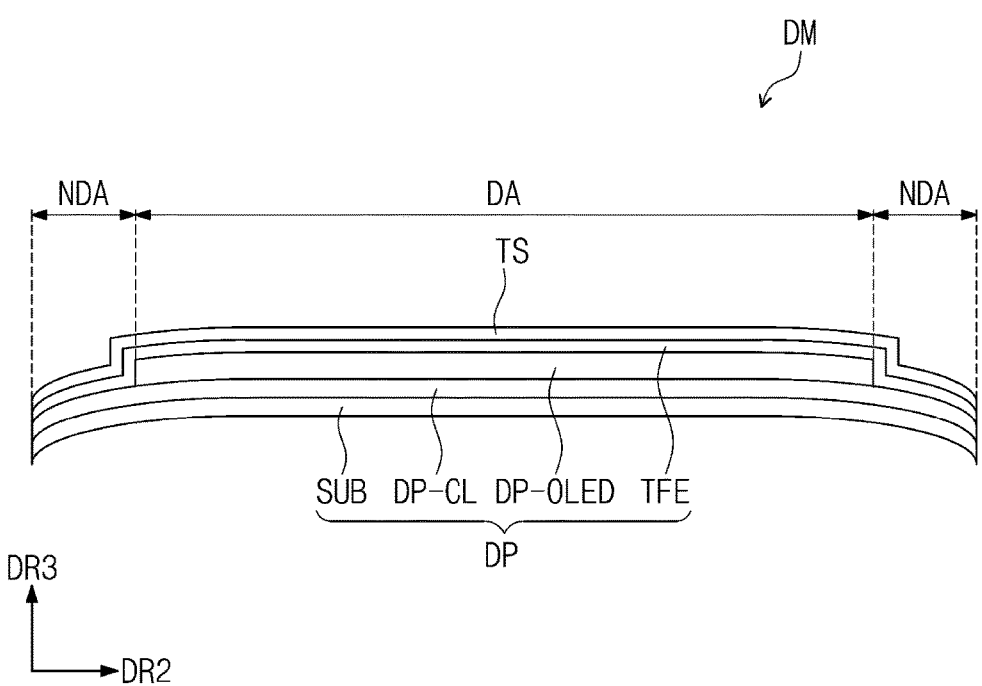
FIG. 3 is a cross-sectional view of a display module according to an embodiment of the invention.

FIG. 3 is a cross-sectional view of a display module DM according to an embodiment of the invention.

Referring to FIG. 3, an embodiment of the display module DM may include a display panel DP and a touch detection unit TS. FIG. 3 illustrates one exemplary embodiment where the display panel DP is an organic light emitting display panel. However, embodiments of the invention are not limited thereto, and alternatively, the display panel DP may be a liquid crystal display panel, a plasma display panel, or an electrophoretic display panel.

In an embodiment, the display panel DP includes a base layer SUB, a circuit layer DP-CL disposed on the base layer SUB, a light emitting device layer DP-OLED, and a thin film sealing layer TFE.

The base layer SUB may include a plastic film. The base layer SUB may include a plastic substrate, a glass substrate, a metal substrate, or an organic/inorganic composite material substrate as a flexible substrate. The plastic substrate may include at least one of acrylic resin, methacrylic resin, polyisoprene resin, vinyl resin, epoxy resin, urethane resin, cellulose resin, siloxane-based resin, polyimide-based resin, polyamide-based resin, and perylene resin.

The circuit layer DP-CL may include a plurality of insulation layers, a plurality of conductive layers, and a semiconductor layer. The plurality of conductive layers of the circuit layer DP-CL may constitute signal lines or a control circuit of a pixel.

The light emitting device layer DP-OLED includes organic light emitting diodes.

The thin film sealing layer TFE seals the light emitting device layer DP-OLED. The thin film sealing layer TFE includes a plurality of inorganic thin films and at least one organic thin film therebetween. The inorganic thin films protect the light emitting device layer DP-OLED from moisture/oxygen and the organic thin film protects the light emitting device layer DP-OLED from a foreign material such as dust particles.

The touch detection unit TS includes touch sensors and touch signal lines. The touch sensors and the touch signal lines may have a single or multilayer structure. The touch sensors and the touch signal lines may include at least one of indium tin oxide ("ITO"), indium zinc oxide ("IZO"), zinc oxide (ZnO), indium tin zinc oxide ("ITZO"), poly(3,4-ethylenedioxythiophene) ("PEDOT"), metal nano wire and graphene. The touch sensors and the touch signal lines may include a metal layer, for example, molybdenum, silver, titanium, copper, aluminum, or an alloy thereof. The touch sensors and the touch signal lines may have a same layer structure as each other, or may have different layer structures from each other.

Figure 4:
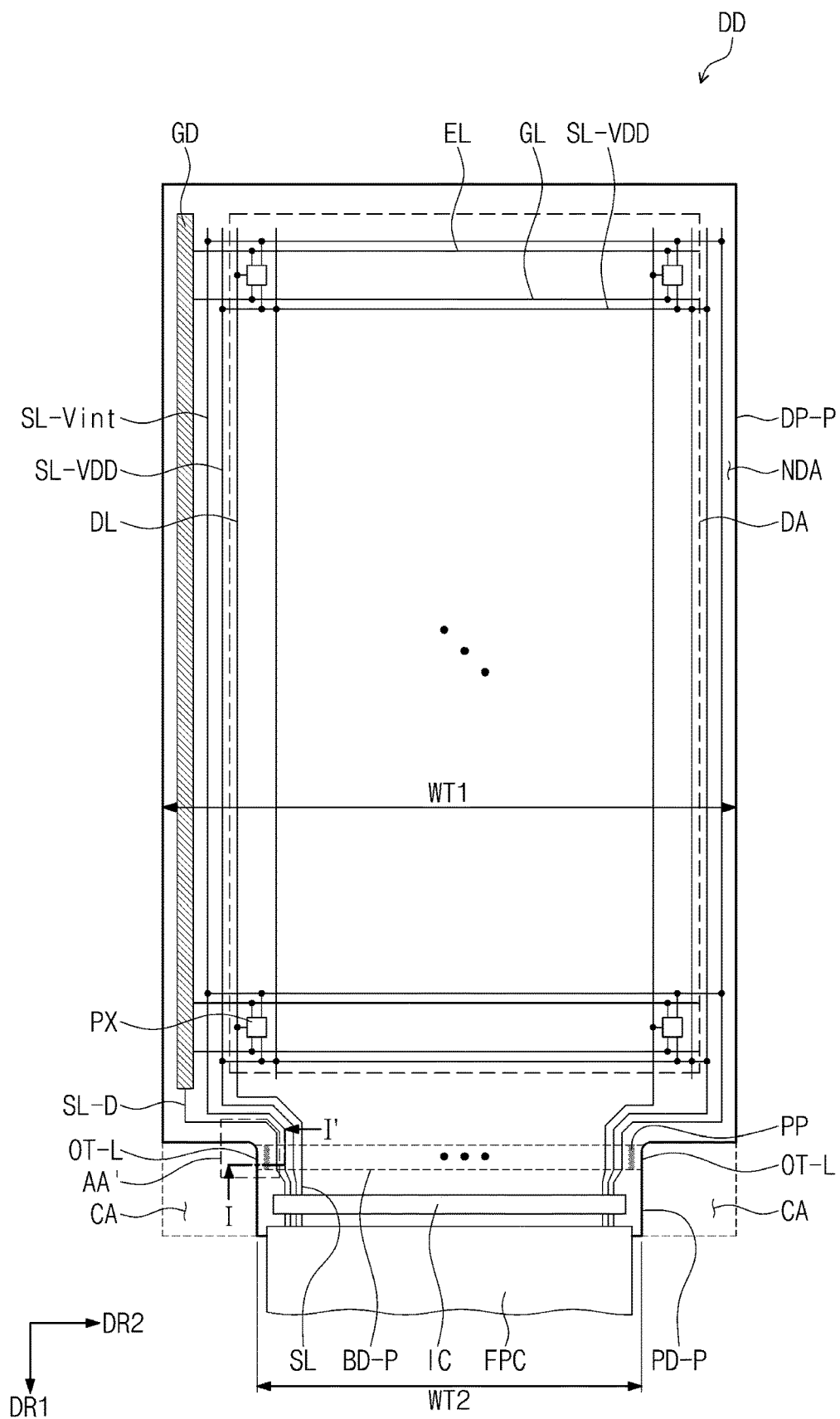
FIG. 4 is a plan view of a display device according to an embodiment of the invention.

FIG. 4 is a plan view of a display device DD according to an embodiment of the invention.

Referring to FIG. 4, an embodiment of the display device DD may include a display part DP-P, a bending part BD-P, and a pad part PD-P.

The display part (e.g., a display panel) DP-P includes a display area DA and a non-display area NDA when viewed from a plan view. The display part DP-P includes a plurality of pixels PX. An area where the plurality of pixels PX is disposed may be defined as the display area DA. In an embodiment, the non-display area NDA may be defined along opposing side lines of the display area DA.

The display part DP-P includes gate lines GL, data lines DL, light emitting lines EL, a control signal line SL-D, an initialization voltage line SL-Vint, and a voltage line SL-VDD.

The gate lines GL are respectively connected to corresponding pixels PX among the plurality of pixels PX, and the data lines DL are respectively connected to corresponding pixels PX among the plurality of pixels PX. Each of the light emitting lines EL may be arranged parallel to a corresponding gate line among the gate lines GL. The control signal line SL-D may provide control signals to the gate driving circuit GD. The initialization voltage line SL-Vint may provide an initialization voltage to the plurality of pixels PX. The voltage line SL-VDD may be connected to the plurality of pixels PX and provide a first voltage to the plurality of pixels PX. The voltage line SL-VDD may include a plurality of lines extending in the first direction DR1 and a plurality of lines extending in the second direction DR2.

The gate driving circuit GD, to which the gate lines GL and the light emitting lines EL are connected, may be disposed at a side of the non-display area NDA. Some of the gate lines GL, the data lines DL, the light emitting lines EL, the control signal line SL-D, the initialization voltage line SL-Vint, and the voltage line SL-VDD are disposed at a same layer, and some of them are disposed at different layers.

A driving chip IC and a printed circuit board FPC may be mounted at the pad part PD-P.

The driving chip IC may be electrically coupled to a terminal of the pad part PD-P. The driving chip IC may provide a driving signal and data to the pixels PX of the display area DA. The driving chip IC and the pad part PD-P may be electrically connected to each other through an anisotropic conductive film ("ACF"). However, the invention is not limited thereto, and the driving chip IC and the pad part PD-P may be bonded through a solder bump. The driving chip IC may be mounted on the pad part PD-P through a chip on plastic ("COP") method or a chip on glass ("COG") method.

The printed circuit board FPC may be electrically coupled to the pad part PD-P. The printed circuit board FPC may have a flexible property. The printed circuit board FPC may deliver a control signal for controlling the drive of the display panel DP. The printed circuit board FPC and the pad part PD-P may be electrically connected to each other through an ACF.

The bending part BD-P is disposed between the display part DP-P and the pad part PD-P. The bending part BD-P may connect the display part DP-P and the pad part PD-P to each other.

The bending part BD-P may include two opposing side ends OT-L, a plurality of wires SL, and a pattern part PP. The two opposing side ends OT-L may be opposing side ends connected to an end of the display part DP-P and opposing side ends of the pad part PD-P as opposing side ends extending along the first direction DR1. The wires SL may connect wires of the display part DP-P and wires of the pad part PD-P. The pattern part PP may be disposed between each of the two opposing side ends OT-L and the plurality of wires SL.

FIG. 4 illustrates a state before the bending part BD-P and both ends of the display part DP-P are bent. In such a state, the display part DP-P, the bending part BD-P, and the pad part PD-P may be sequentially arranged along the first direction DR1. A first width WT1 parallel to the second direction DR2 of the display part DP-P may be greater than a second width WT2 parallel to the second direction DR2 of the bending part BD-P. The second width WT2 may be the length measured between the side ends OT-L of the bending part BD-P. That is, the side ends OL-L may mean the outermost lines that determine the width of the part BD-P. Both ends of the display part DP-P that protrudes further than the bending part BD-P may be bent to correspond to the bending areas BA1 and BA2 of FIG. 1.

In an embodiment, a cut area CA indicated by a dotted line of FIG. 4 may be cut to form the bending part BD-P having the second width WT2 less than the first width WT1. The cut area CA may be cut through a laser cutting method. The pattern part PP may prevent the damage of the bending part BD-P, which is caused by a heat occurring when the cut area CA is cut through laser cut. This will be described later in greater detail.

Figure 5:
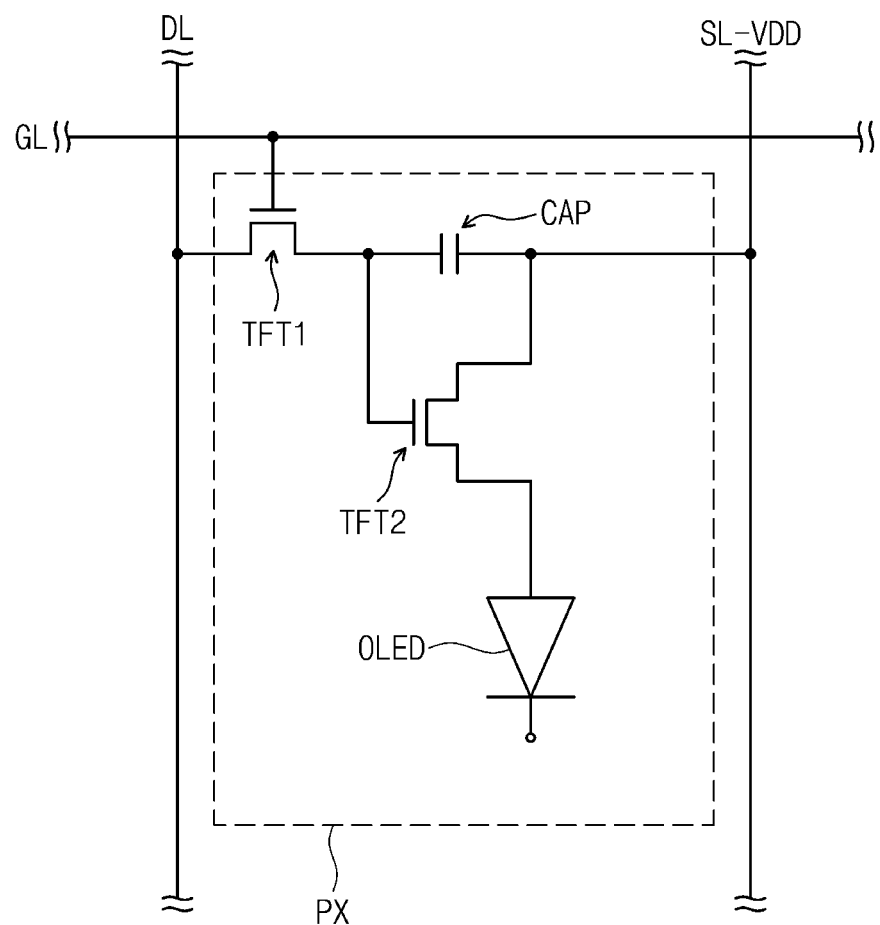
FIG. 5 is an equivalent circuit diagram of a pixel according to an embodiment of the invention.

FIG. 5 is an equivalent circuit diagram of a pixel PX according to an embodiment of the invention.

FIG. 5 shows an exemplary embodiment of a pixel PX connected to a gate line GL, a data line DL, and a voltage line SL-VDD. A configuration of the pixel PX is not limited thereto and may be variously modified and implemented.

The pixel PX includes an organic light emitting diode OLED as a display element. The organic light emitting diode OLED may be a front light-emitting-type diode or a rear-light-emitting-type diode. The pixel PX includes a first transistor TFT1 (or a switching transistor), a second transistor TFT2 (or a driving transistor), and a capacitor CAP, as a driving circuit for driving the organic light emitting diode OLED.

The first transistor TFT1 outputs a data signal applied to the data line DL in response to a scan signal applied to the gate line GL. The capacitor CAP charges a voltage corresponding to a data signal received from the first transistor TFT1.

The second transistor TFT2 is connected to the organic light emitting diode OLED. The second transistor TFT2 controls a driving current flowing through the organic light emitting diode OLED in correspondence to a charge amount stored in the capacitor CAP. The organic light emitting device OLED may emit light during a turn-on section of the second transistor TFT2.

Figure 6:
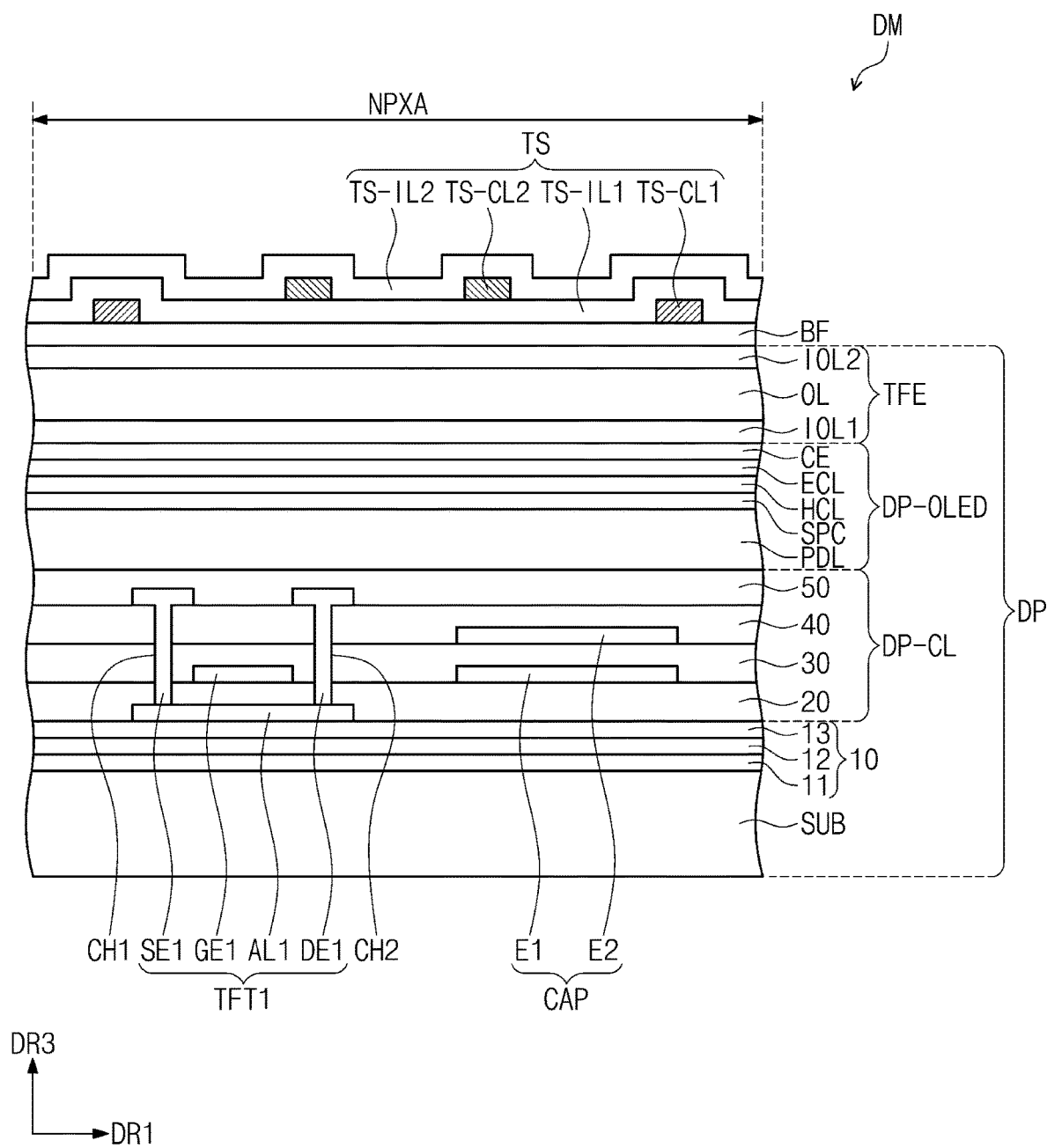
FIGS. 6 and 7 are partial sectional views of a display module according to an embodiment of the invention.
Figure 7:
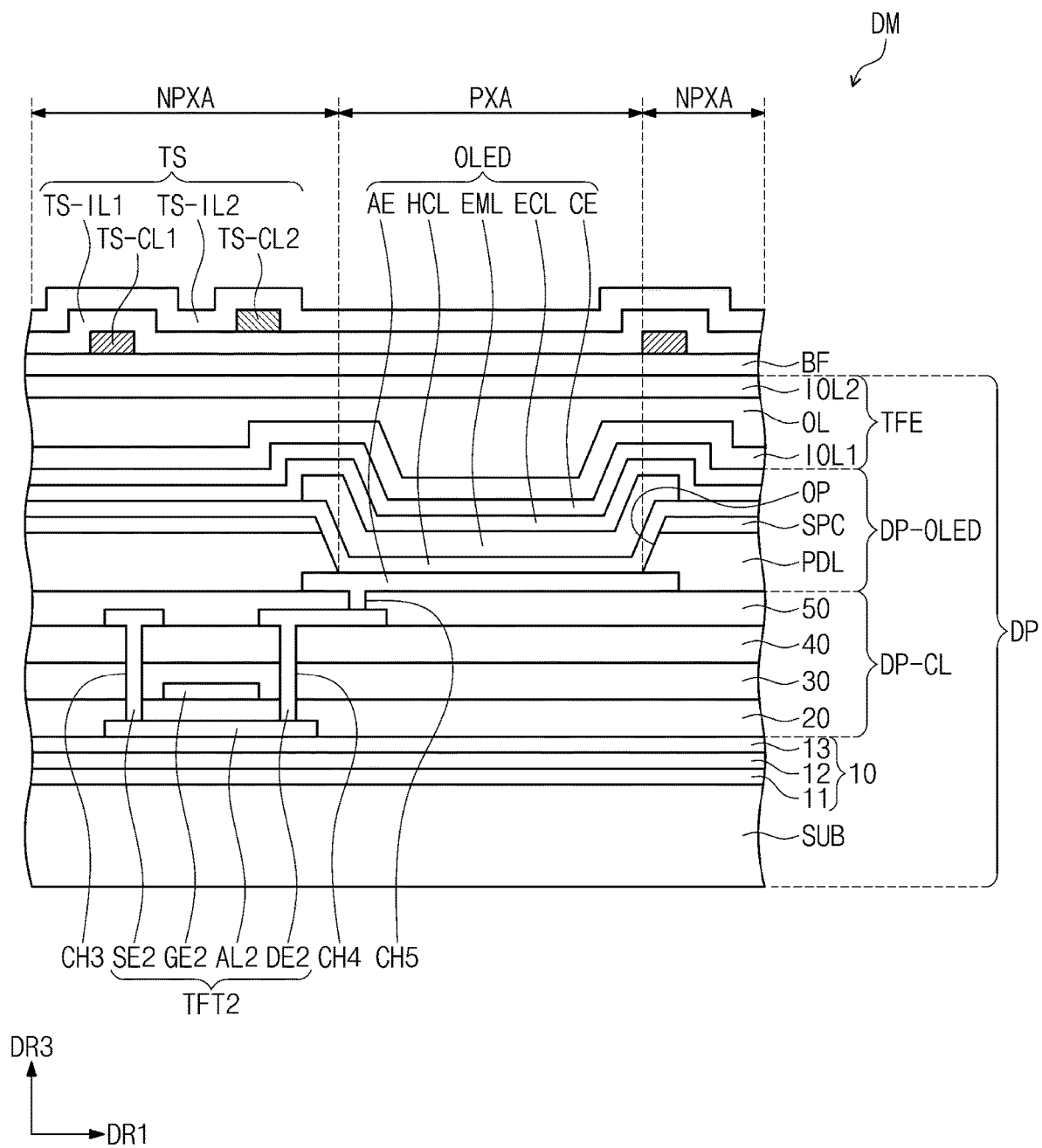

FIGS. 6 and 7 are partial sectional views of a display module DM according to an embodiment of the invention.

FIG. 6 illustrates a section of a portion of a display module DM corresponding to the first transistor TFT1 and the capacitor CAP of the equivalent circuit shown in FIG. 5. FIG. 7 illustrates a section of a portion of a display module DM corresponding to the second transistor TFT2 and the organic light emitting diode OLED of the equivalent circuit shown in FIG. 5.

In an embodiment, as shown in FIGS. 6 and 7, a barrier layer 10 is disposed on a base layer SUB. The barrier layer 10 may have a single layer structure or a multilayer structure. In an embodiment, the barrier layer 10 may include first to third layers 11, 12 and 13. The first layer 11 and the third layer 13 may be inorganic layers. The inorganic layers may include at least one of a silicon nitride, a silicon oxynitride, a silicon oxide, a titanium oxide, and an aluminum oxide. The second layer 12 may be an organic layer. The organic layer may include a polymer (for example, acrylic-based) organic layer. However, this is merely exemplary and the invention is not limited thereto. In an alternative embodiment, the barrier layer 10 may be omitted.

In an embodiment, a circuit layer DP-CL is disposed on the barrier layer 10. A semiconductor pattern AL1 (hereinafter referred to as a first semiconductor pattern) of the first transistor TFT1 and a semiconductor pattern AL2 (hereinafter referred to a second semiconductor pattern) of the second transistor TFT2 are disposed on the barrier layer 10. The first semiconductor pattern AL1 and the second semiconductor pattern AL2 may include at least one material selected from amorphous silicon, polysilicon, and a metal oxide semiconductor. The first semiconductor pattern AL1 and the second semiconductor pattern AL2 may include a same material as each other, or different materials from each other.

A first insulation layer 20 that covers the first semiconductor pattern AL1 and the second semiconductor pattern AL2 is disposed on the base layer SUB. The first insulation layer 20 may include an organic layer and/or an inorganic layer. In one exemplary embodiment, for example, the first insulation layer 20 may include an inorganic thin film. The inorganic thin film may include at least one of a silicon nitride, a silicon oxynitride, a silicon oxide, a titanium oxide, and an aluminum oxide. However, this is merely exemplary and the invention is not limited thereto.

A control electrode GE1 (hereinafter referred to as a first control electrode) of the first transistor TFT1, a control electrode GE2 (hereinafter referred to as a second control electrode) of the second transistor TFT2 and a first electrode E1 are disposed on the first insulation layer 20. In an embodiment, the first control electrode GE1, the second control electrode GE2 and the first electrode E1 may be provided or fabricated through a same photolithography process as the gate lines GL (see FIG. 4). In such an embodiment, the first electrode E1 may be formed of a same material, may have a same layer-stacked structure, and may be disposed on a same layer as the gate lines GL.

A second insulation layer 30 that covers the first control electrode GE1, the second control electrode GE2 and the first electrode E1 is disposed on the first insulation layer 20. The second insulation layer 30 may include an organic layer and/or an inorganic layer. Especially, the second insulation layer 30 may include an inorganic thin film. The inorganic thin film may include at least one of a silicon nitride, a silicon oxynitride, a silicon oxide, a titanium oxide and an aluminum oxide. However, this is merely exemplary and the invention is not limited thereto. A second electrode E2 may be disposed on the second insulation layer 30. The third insulation layer 40 that covers the second electrode E2 is disposed on the first insulation layer 20. The third insulation layer 40 may include an organic layer and/or an inorganic layer. In one exemplary embodiment, for example, the third insulation layer 40 may include an inorganic thin film. The inorganic thin film may include at least one of a silicon nitride, a silicon oxynitride, a silicon oxide, a titanium oxide and an aluminum oxide. However, this is merely exemplary and the invention is not limited thereto.

The data lines DL (see FIG. 4) may be disposed on the third insulation layer 40. An input electrode SE1 (hereafter referred to as a first input electrode) and an output electrode DE1 (hereinafter referred to as a first output electrode) of the first transistor TFT1 are disposed on the third insulation layer 40. An input electrode SE2 (hereafter referred to as a second input electrode) and an output electrode DE2 (hereinafter referred to as a second output electrode) of the second transistor TFT2 are disposed on the third insulation layer 40. The first input electrode SE1 may branch from a corresponding data line among the data lines DL. The power line PL (see FIG. 4) may be disposed in or directly on a same layer as the data lines DL. The second input electrode SE2 may extend or branch from the power line PL.

In an embodiment, as shown in FIG. 6, the second electrode E2 of the capacitor CAP may be disposed between the second insulation layer 30 and the third insulation layer 40, but the invention is not limited thereto. In an alternative embodiment, the second electrode E2 of the capacitor CAP may be disposed on the third insulation layer 40. In such an embodiment, the second electrode E2 may be manufactured through a same photolithography process as the data lines DL and the power line PL. In such an embodiment, the second electrode E2 may be formed of a same material, may have a same layer-stacked structure, and may be disposed in or directly on a same layer as the data lines DL and the power line PL.

Each of the first input electrode SE1 and the first output electrode DE1 is connected to the first semiconductor pattern AL1 through a first through hole CH1 and a second through hole CH2, which are defined through the first to third insulation layers 20, 30 and 40. The first output electrode DE1 may be electrically connected to the first electrode E1. In one exemplary embodiment, for example, the first output electrode DE1 may be connected to the first electrode E1 via a through hole (not shown) defined through the second insulation layer 20 and the third insulation layer 30. Each of the second input electrode SE2 and the second output electrode DE2 is connected to the second semiconductor pattern AL2 through a third through hole CH3 and a fourth through hole CH4 penetrating the first to third insulation layers 20, 30, and 40. According to an alternative embodiment of the invention, the first transistor TFT1 and the second transistor TFT may be modified to have a bottom gate structure.

A fourth insulation layer 50 that covers the first input electrode SE1, the first output electrode DE1, the second input electrode SE2 and the second output electrode DE2 is disposed on the third insulation layer 40. The fourth insulation layer 50 may include an organic layer and/or an inorganic layer. In an embodiment, the fourth insulation layer 50 may include an organic material for providing a flat surface. The organic material may include a polymer (for example, acrylic-based) organic layer. However, this is merely exemplary and the invention is not limited thereto.

One of the first to fourth insulation layers 20, 30, 40 and 50 may be omitted according to a circuit structure of a pixel. Each of the first to third insulation layers 20, 30 and 40 may be defined as an interlayer insulation layer. The interlayer insulation layer is disposed between a conductive pattern disposed therebelow and a conductive pattern disposed thereabove to insulate the conductive patterns.

A light emitting element layer DP-OLED is disposed on the fourth insulation layer 50. A pixel definition layer PDL, a spacer SPC and an organic light emitting diode OLED are disposed on the fourth insulation layer 50.

An anode AE is disposed on the fourth insulation layer 50. The anode AE is connected to the second output electrode DE2 via a fifth through hole CH5 defined through the fourth insulation layer 50. An opening part OP is defined in the pixel definition layer PDL and the spacer SPC. The opening part OP exposes at least a portion of the anode AE.

The spacer SPC is disposed on the pixel definition layer PDL to support a mask for forming or providing the organic light emitting diode OLED. In one exemplary embodiment, for example, the spacer SPC is formed through a same method as the pixel definition layer PDL, but the invention is not limited thereto. In an embodiment, the spacer SPC may be formed on only a partial area of the pixel definition layer PDL or may be omitted.

The light emitting element layer DP-OLED includes a light emitting area PXA and a non-light emitting area NPXA adjacent to the light emitting area PXA. The non-light emitting area NPXA may surround the light emitting area PXA. The light emitting area PXA may be defined to correspond to a partial area of the anode AE exposed by the opening part OP.

A hole control layer HCL may be commonly disposed in the light emitting area PXA and the non-light emitting area NPXA. Although not shown in the drawing, a common layer such as the hole control layer HCL may be commonly disposed further in the plurality of pixels PX (see FIG. 4).

An organic light emitting layer EML is disposed on the hole control layer HCL. The organic light emitting layer EML may be disposed only in an area corresponding to the opening part OP. In an embodiment, the organic light emitting layer EML may be divided into a plurality part disposed in the plurality of pixels PX, respectively.

An electronic control layer ECL is disposed on the organic light emitting layer EML. A cathode CE is disposed on the electronic control layer ECL. The cathode CE is commonly disposed at the plurality of pixels PX.

In an embodiment, the organic light emitting layer EML may have a patterned shape, but not being limited thereto. Alternatively, the organic light emitting layer EML may be commonly disposed in the plurality of pixels PX. In an embodiment, the organic light emitting layer EML may generate white light. In an embodiment, the organic light emitting layer EML may have a multilayer structure.

According to an embodiment, the thin film sealing layer TFE directly covers the cathode CE. According to an embodiment of the invention, a capping layer that covers the cathode CE may be further disposed. In an embodiment, the thin film sealing layer TFE directly covers the capping layer. The thin film sealing layer TFE may include a plurality of inorganic thin films IOL1 and IOL2 and an organic thin film OL.

A buffer layer BF may be disposed on the thin film sealing layer TFE. The buffer layer BF includes an organic layer and/or an inorganic layer. In such an embodiment, the buffer layer BF may include an inorganic thin film. The inorganic thin film may include at least one of a silicon nitride, a silicon oxynitride, a silicon oxide, a titanium oxide and an aluminum oxide. However, this is merely exemplary and the invention is not limited thereto. A touch detection unit TS may be disposed on the buffer layer BF. The touch detection unit TS includes a first conductive layer TS-CL1, a first insulation layer TS-IL1 (also referred to as a first touch insulation layer), a second conductive layer TS-CL2, and a second insulation layer TS-IL2 (also referred to as a second touch insulation layer).

Each of the first conductive layer TS-CL1 and the second conductive layer TS-CL2 may have a single layer structure or a multilayer structure stacked along the third direction DR3. A conductive layer of the multilayer structure may include at least two of transparent conductive layers and metal layers. A conductive layer of the multilayer structure may include metal layers including different metals from each other. The transparent conductive layer may include at least one of ITO, IZO, zinc oxide (ZnO), ITZO, PEDOT, metal nano wire and graphene. The metal layer may include silver, titanium, copper, aluminum, or an alloy thereof.

In an embodiment, each of the first conductive layer TS-CL1 and the second conductive layer TS-CL2 includes a plurality of patterns. In such an embodiment, the first conductive layer TS-CL1 includes first conductive patterns, and the second conductive layer TS-CL2 includes second conductive patterns. Each of the first conducive patterns and the second conducive patterns may include touch electrodes and touch signal lines.

Each of the first touch insulation layer TS-IL1 and the second touch insulation layer TS-IL2 may have a single layer structure or a multilayer structure. Each of the first touch insulation layer TS-IL1 and the second touch insulation layer TS-IL2 may include at least one of an inorganic layer and an organic layer.

In such an embodiment, the first touch insulation layer TS-IL1 insulates a first conductive layer TS-CL1 and a second conductive layer TS-CL2, but the form thereof is not limited. In an embodiment, the form of the first touch insulation layer TS-IL1 may be modified based on the forms of first conductive patterns and second conductive patterns. The first touch insulation layer TS-IL1 may cover the thin film sealing layer TFE entirely or may include a plurality of insulation patterns.

In an embodiment, the touch detection unit TS may be a double conductive layer-type touch detection unit, but the invention is not limited. Alternatively, the touch detection unit TS may be a single conductive layer-type touch detection unit including a conductive layer and an insulation layer that covers the conductive layer. The conductive layer includes touch sensors and touch signal lines connected to the touch sensors. The single conductive layer-type touch detection unit may obtain coordinate information through a self-cap method.

Figure 8:
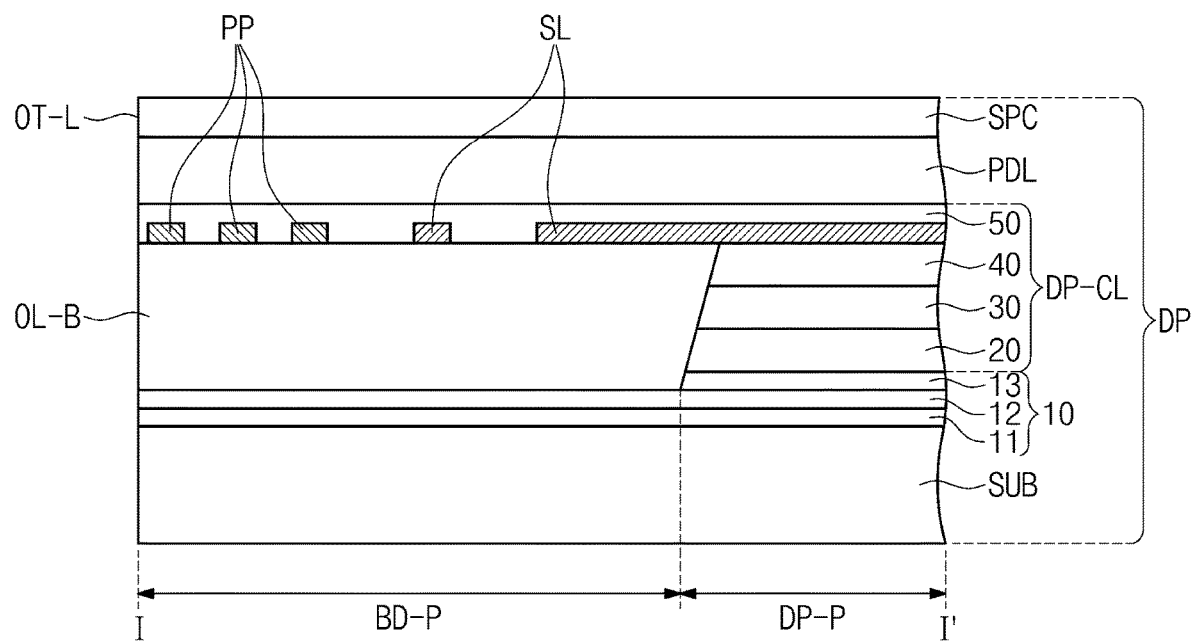
FIG. 8 is a cross-sectional view taken along line I-I' shown in FIG. 4.

FIG. 8 is a cross-sectional view taken along line I-I' shown in FIG. 4 according to an embodiment. FIG. 8 is a partial sectional view of a bending part BD-P and a display part DP-P.

Referring to FIGS. 4, 6, 7 and 8, in an embodiment, a third layer 13 including an inorganic matter, a first insulation layer 20, a second insulation layer 30 and a third insulation layer 40 may not be disposed on the bending part BD-P. Accordingly, a stress applied to the bending part BD-P bending toward the rear of the display part DP-P may be reduced.

A first organic layer OL-B may be disposed at the bending part BD-P. A pattern part PP may be disposed on the first organic layer OL-B. The pattern part PP may be disposed between a side end OT-L and wires SL. In an embodiment, the pattern part PP may be manufactured through a same photolithography process as the first input electrode SE1 and the second input electrode SE2. In such an embodiment, the pattern part PP may include or be formed of a same material and may have a same layer-stacked structure as the first input electrode SE1 and the second input electrode SE2. The pattern part PP may include an inorganic matter, e.g., a metallic material. In one exemplary embodiment, for example, the pattern part PP, the first input electrode SE1 and the second input electrode SE2 may include molybdenum, silver, titanium, copper, aluminum, or an alloy thereof and is not particularly limited thereto.

The pattern part PP may effectively prevent a heat damage of the bending part BD-P when the side end OT-L is formed through a laser cutting process. An organic matter is typically vulnerable to the deformation by heat than an inorganic matter. According to an embodiment, the pattern part PP including a material having a lesser deformation by heat than an organic matter is disposed in an area adjacent to the side end OT-L. In such an embodiment, heat damage caused by a laser cutting process is reduced by the pattern part PP such that the deformation of the bending part BD-P may be reduced. As a result, a bending stress occurring when the bending part BD-P is bent may be reduced. In such an embodiment, defects by a stress applied to the bending part BD-P may be reduced and the reliability and manufacturing yield of a product may be improved.

Figure 9A:
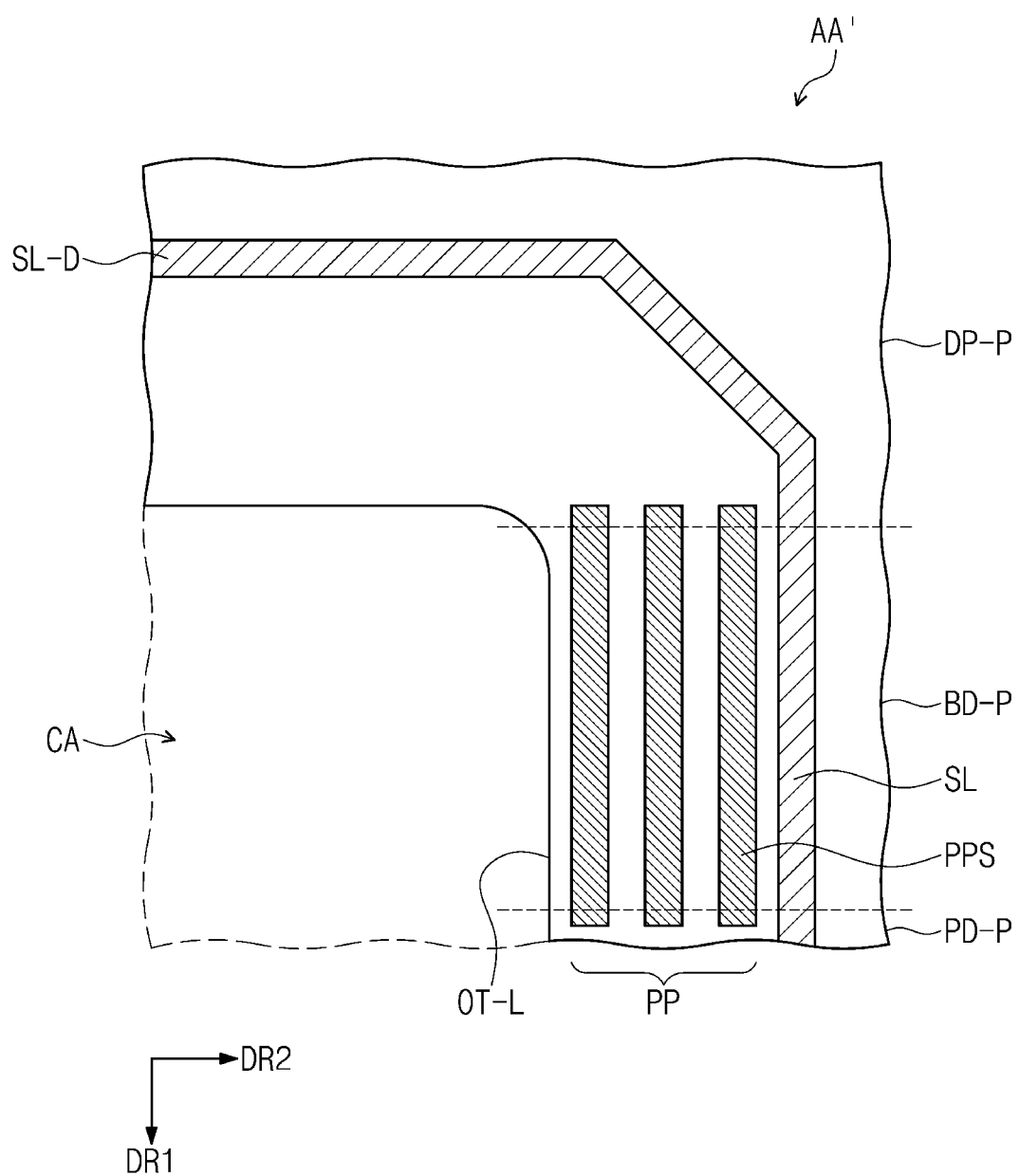
FIG. 9A is an enlarged plan view of an area AA' shown in FIG. 4 according to an embodiment of the invention.

FIG. 9A is an enlarged plan view of an area AA' shown in FIG. 4 according to an embodiment.

Referring to FIG. 9A, in an embodiment, a pattern part PP may be disposed between a wire SL and a side end OT-L of the bending part BD-P when viewed from a plan view. When viewed from the plan view, as shown in FIG. 9A, the pattern part PP may be disposed spaced apart from the side end OT-L. In such an embodiment, the possibility of a crack occurrence on the pattern part PP during a process in which the side end OT-L is formed may be reduced.

The side end OT-L of the bending part BD-P may extend along the first direction DR1 and the pattern part PP may include patterns PPS extending along the first direction DR1. The patterns PPS may be arranged along a second direction DR2 intersecting the first direction DR1. Since the pattern part PP includes the patterns PPS in a slit form, even if cracks occur in the pattern of a portion in the pattern part PP, crack propagation may be effectively prevented.

In an embodiment, as shown in FIG. 9A, the pattern part PP may include three patterns PPS, but the invention is not limited thereto. In an alternative embodiment, the pattern part PP may include only one pattern. In another alternative embodiment, the pattern part PP may include two or more patterns.

Figure 9B:
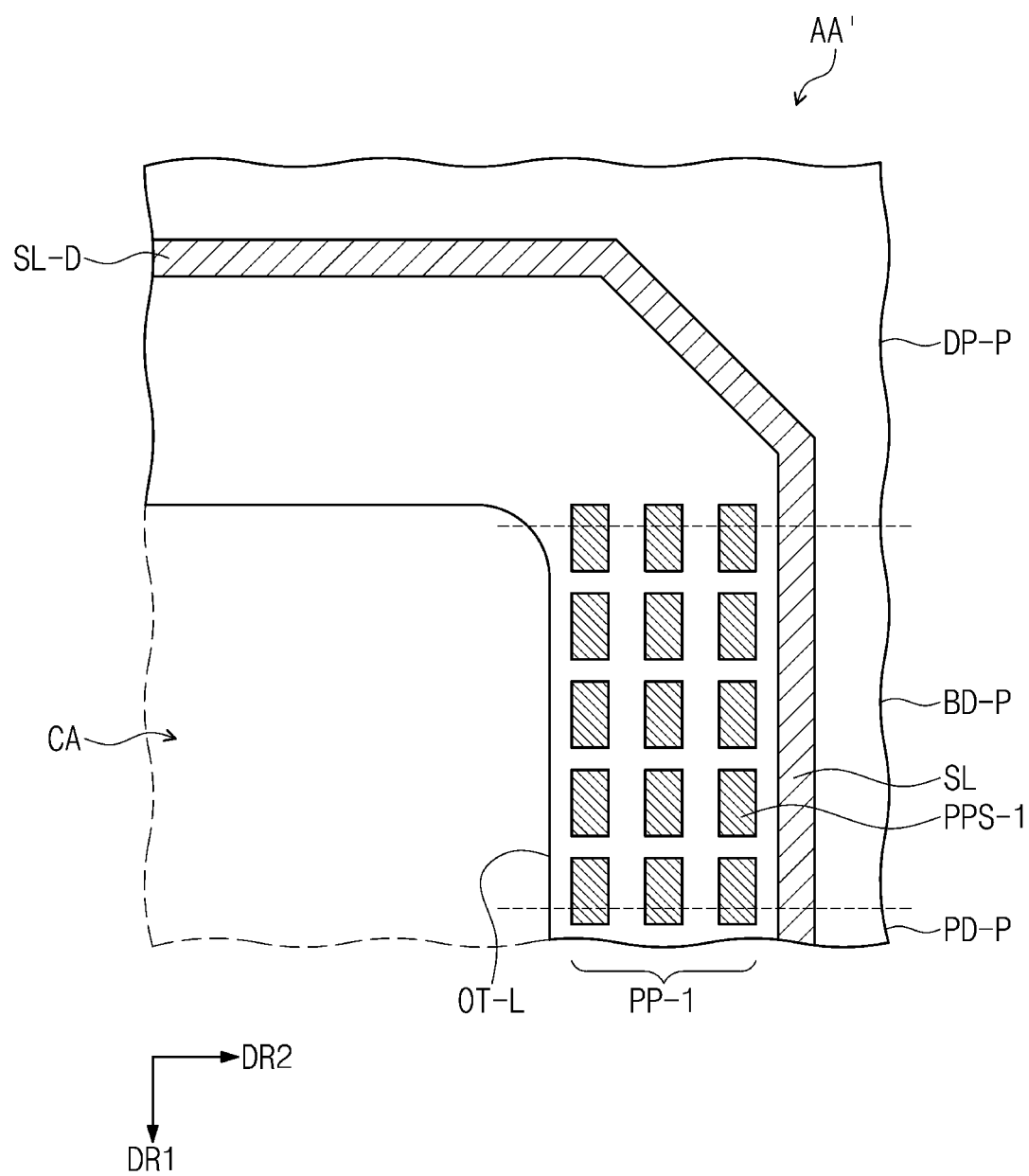
FIG. 9B is an enlarged plan view of an area AA' shown in FIG. 4 according to an alternative embodiment of the invention.

FIG. 9B is an enlarged plan view of an area AA' shown in FIG. 4 according to an alternative embodiment.

Referring to FIG. 9B, a pattern part PP-1 may be disposed between a wire SL and a side end OT-L of the bending part BD-P when viewed from a plan view.

The pattern part PP-1 may include a plurality of patterns PPS-1, and the plurality of patterns PPS-1 may be arranged along the first direction DR1 and the second direction DR2. In such an embodiment, the plurality of patterns PPS-1 may be arranged substantially in a matrix form. The plurality of patterns PPS-1 may be arranged along the first direction DR1, and the plurality of patterns PPS-1 may have a dotted-line form adjacent to the side end OT-L of the bending part BD-P.

In such an embodiment, the pattern PPS-1 may have a form arranged along the first direction DR1 and the second direction DR2, as an island form, as shown in FIG. 9B, such that, a stress applied to the pattern part PP-1 when the bending part BD-P is bent may be reduced.

Figure 9C:
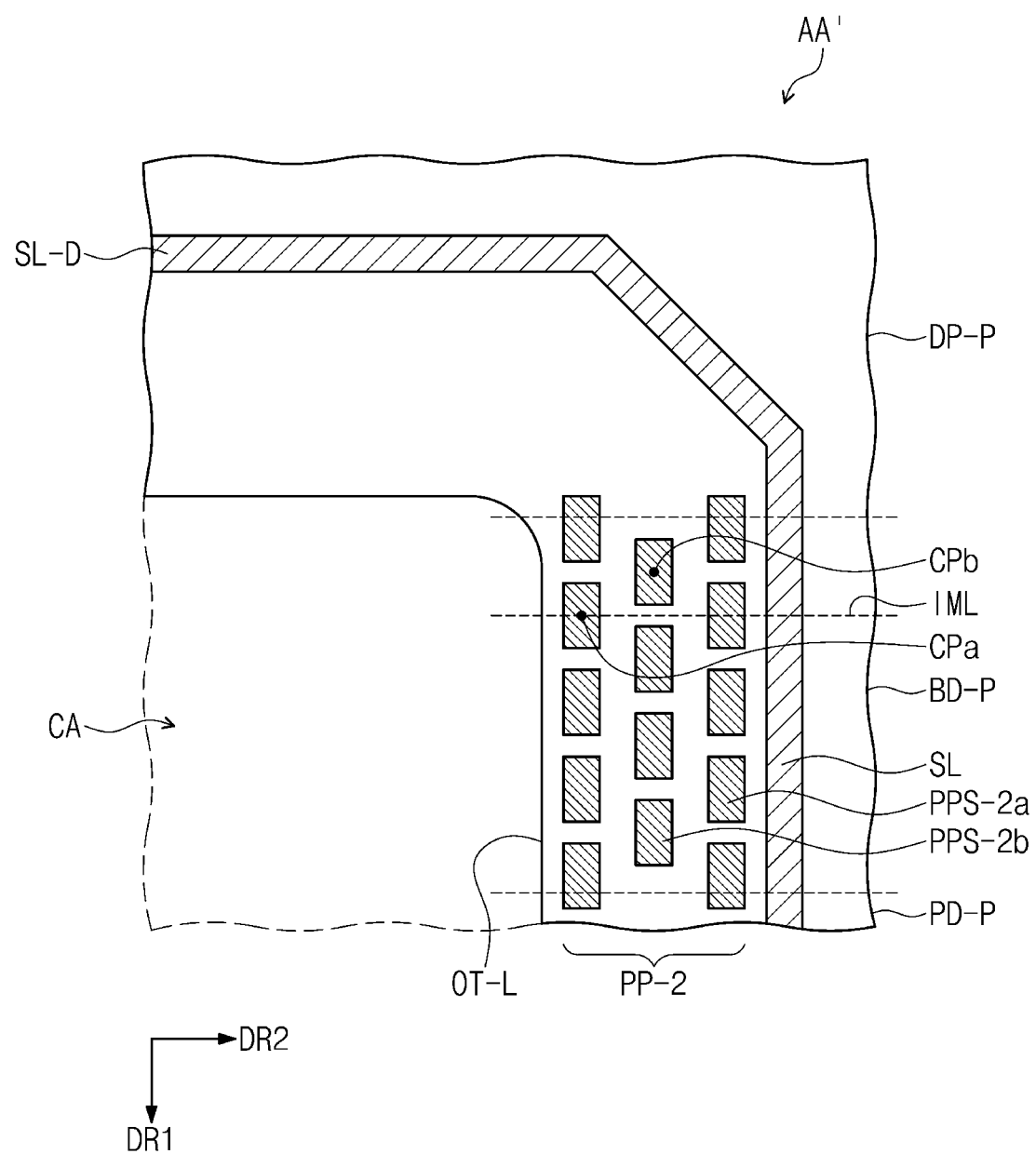
FIG. 9C is an enlarged plan view of an area AA' shown in FIG. 4 according to another alternative embodiment of the invention.

FIG. 9C is an enlarged plan view of an area AA' shown in FIG. 4 according to another alternative embodiment.

Referring to FIG. 9C, a pattern part PP-2 may be disposed between a wire SL and a side end OT-L of the bending part BD-P when viewed from a plan view. The pattern part PP-2 may include first patterns PPS-2a arranged along the first direction DR1 and second patterns PPS-2b arranged along the first direction DR1.

In an embodiment, as shown in FIG. 9C, the first patterns PPS-2a and the second patterns PPS-2b may be alternately arranged along the second direction DR2. The center point CPa of each of the first patterns PPS-2a and the center point CPb of each of the second patterns PPS-2b may be arranged in a zigzag pattern along the first direction DR1 and the second direction DR2. In such an embodiment, an imaginary line IML passing through the center point CPa of each of the first patterns PPS-2a and extending along the second direction DR2 may not overlap or be spaced apart from the center point CPb of each of the second patterns PPS-2b.

Figure 10:
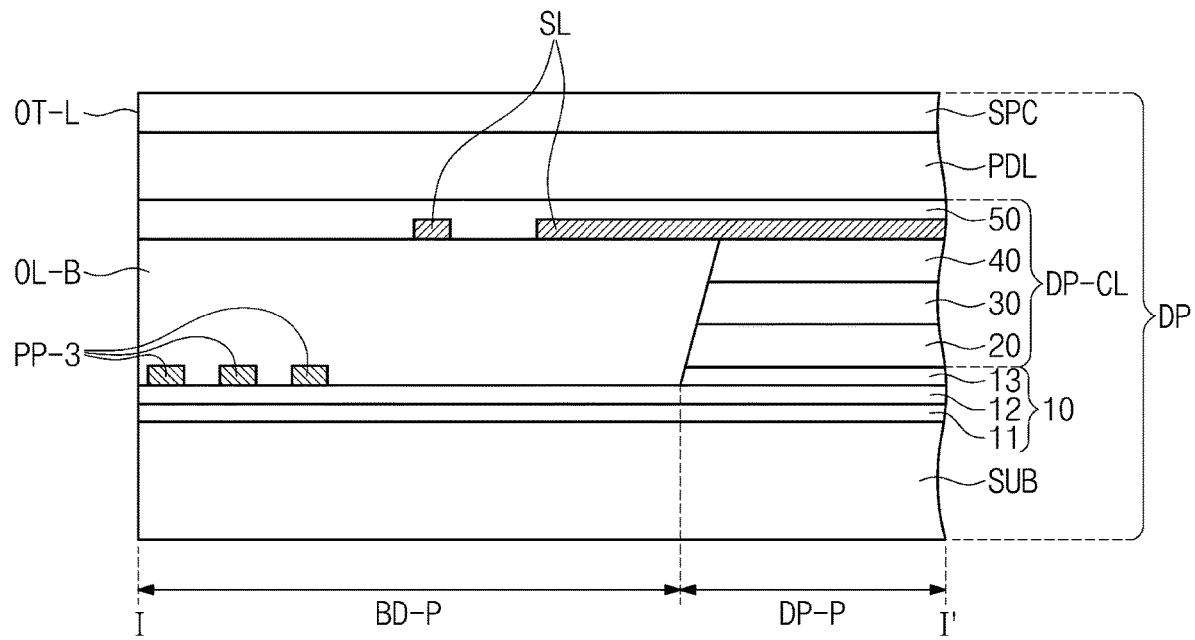
FIG. 10 is a cross-sectional view taken along line I-I' shown in FIG. 4 according to an embodiment of the invention.

FIG. 10 is a cross-sectional view taken along line I-I' shown in FIG. 4 according to an alternative embodiment.

Referring to FIGS. 6, 7 and 10, a pattern part PP-3 may be disposed between a side end OT-L of the bending part BD-P and wires SL. The pattern part PP-3 may be manufactured through a same photolithography process as the first control electrode GE1 and the second control electrode GE2. In such an embodiment, the pattern part PP-3 may include or be formed of a same material and may have a same layer-stacked structure as the first control electrode GE1 and the second control electrode GE2. In one exemplary embodiment, for example, the pattern part PP-3 may include a metallic material. In one exemplary embodiment, for example, the pattern part PP-3 may include at least one of molybdenum, silver, titanium, copper, aluminum and an alloy thereof, but not being limited thereto.

Figure 11:
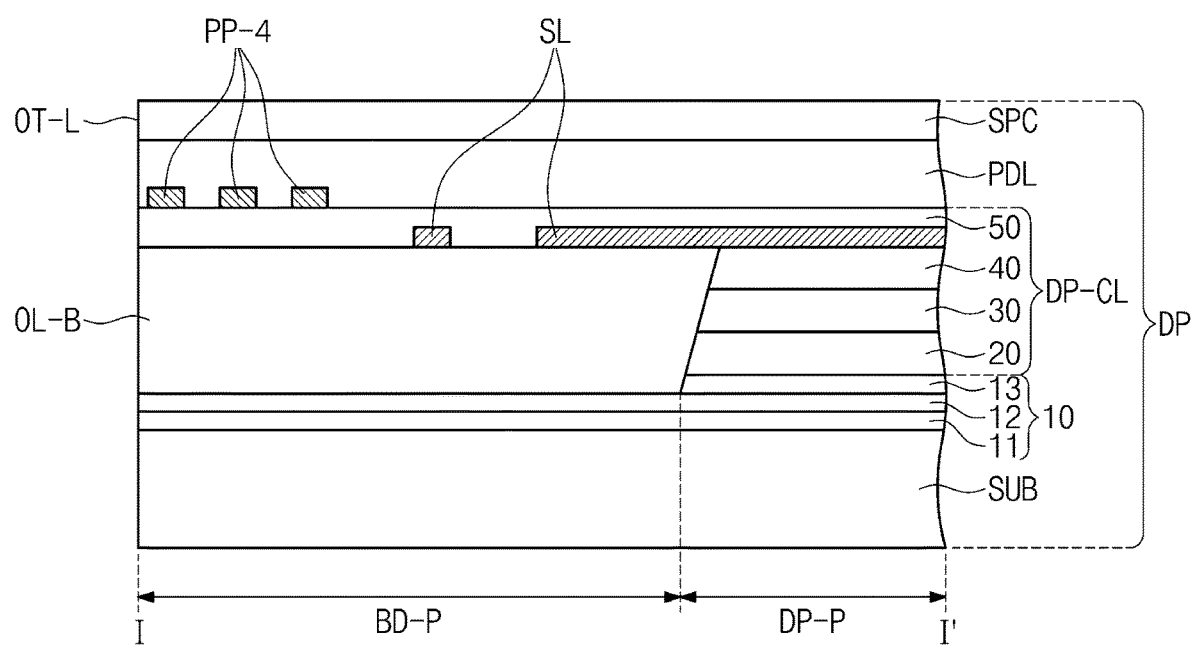
FIG. 11 is a cross-sectional view taken along line I-I' shown in FIG. 4 according to an alternative embodiment of the invention.

FIG. 11 is a cross-sectional view taken along line I-I' shown in FIG. 4 according to another alternative embodiment.

Referring to FIGS. 6, 7 and 11, a pattern part PP-4 may be disposed between a side end OT-L of the bending part BD-P and wires SL. The pattern part PP-4 may be manufactured through a same photolithography process as the anode AE. In such an embodiment, the pattern part PP-4 may include or be formed of a same material and may have a same layer-stacked structure as the anode AE. In one exemplary embodiment, for example, the pattern part PP-4 may include a metallic material. In one exemplary embodiment, for example, the pattern part PP-4 may include at least one of ITO, IZO, zinc oxide (ZnO), ITZO, PEDOT, molybdenum, silver, titanium, copper, aluminum, and an ally thereof.

Figure 12A:
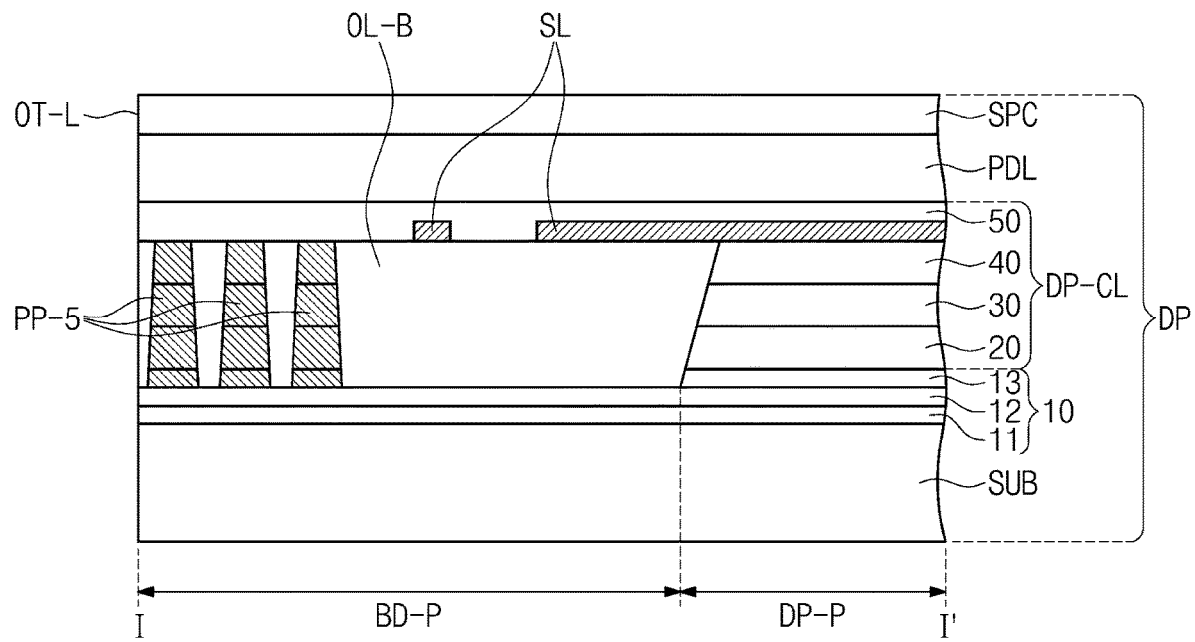
FIG. 12A is a cross-sectional view taken along line I-I' shown in FIG. 4 according to another alternative embodiment of the invention.
Figure 12B:
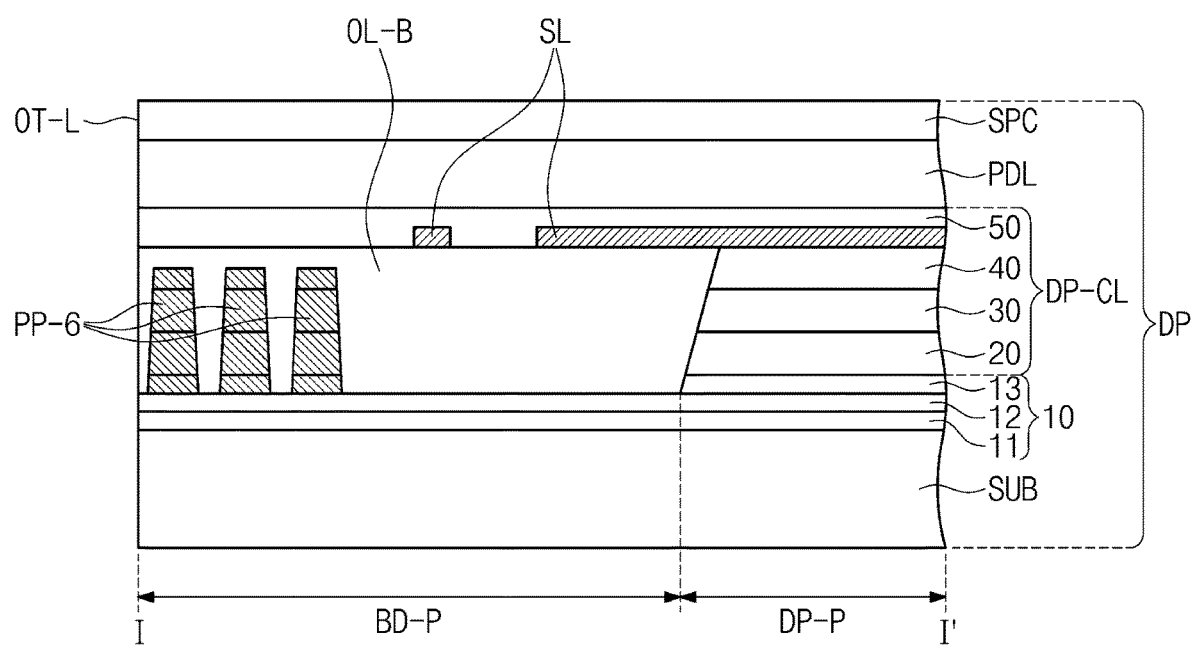
FIG. 12B is a cross-sectional view taken along line I-I' shown in FIG. 4 according to another alternative embodiment of the invention.

FIG. 12A is a cross-sectional view taken along line I-I' shown in FIG. 4 according to another alternative embodiment. FIG. 12B is a cross-sectional view taken along line I-I' shown in FIG. 4 according to another alternative embodiment.

Referring to FIG. 12A, a pattern part PP-5 may include a plurality of inorganic layers. In one exemplary embodiment, for example, the pattern part PP-5 may include four inorganic layers. Each of the four-story inorganic layers may be formed through a same process as a third layer 13, a first insulation layer 20, a second insulation layer 30 and a third insulation layer 40, respectively.

The pattern part PP-5 may effectively prevent a deformation by the heat of the bending part BD-P when the side end OT-L is formed through a laser cutting process. Accordingly, the pattern part PP-5 may effectively prevent the side end OT-L from being contracted toward a wire SL.

Referring to FIG. 12B, a pattern part PP-6 may include a plurality of inorganic layers. The pattern part PP-6 of FIG. 12B may have a height lower than that of the third insulation layer 40. The pattern part PP-6 may be covered by a first organic layer OL-B.

Figure 13:
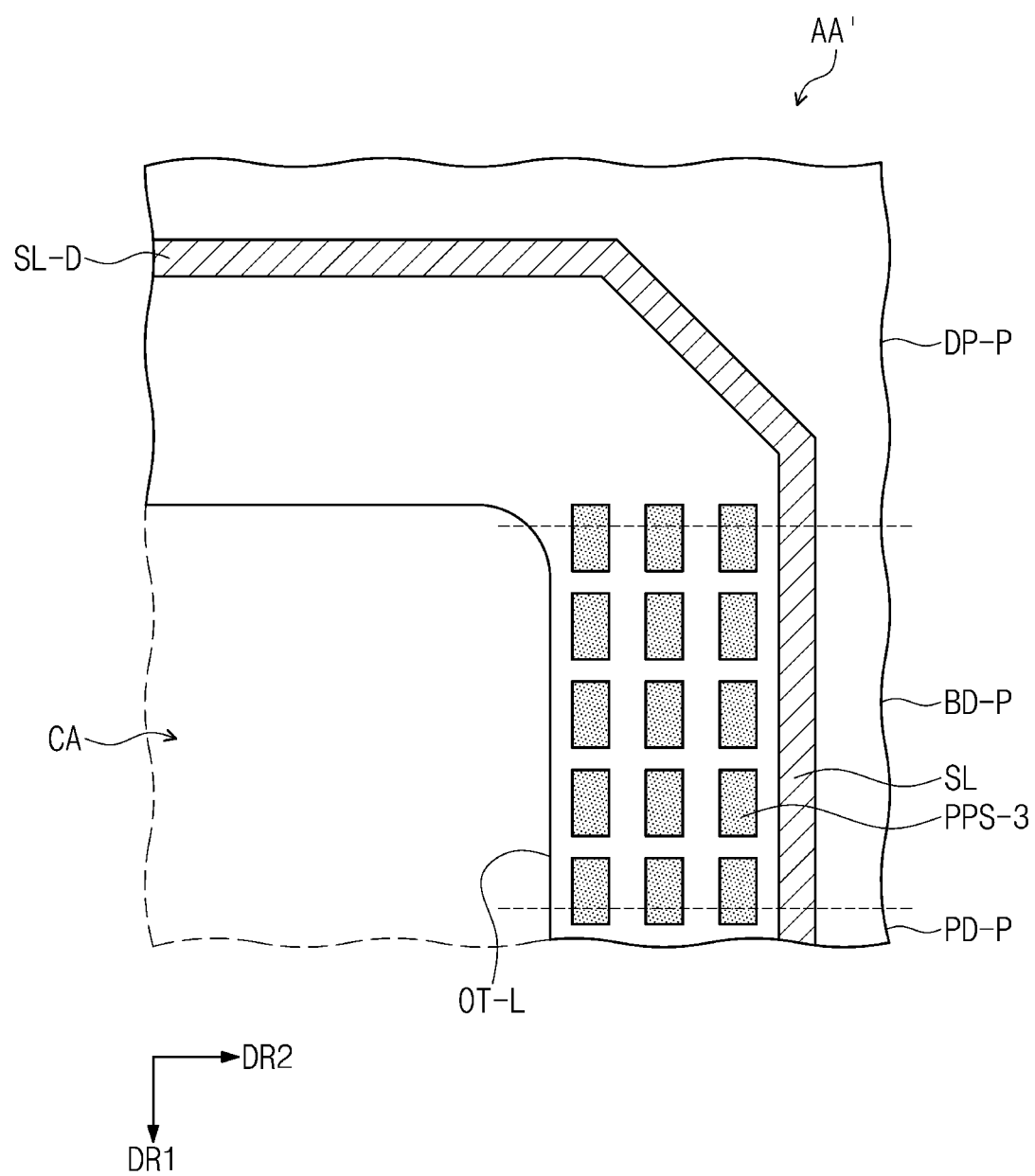
FIG. 13 is an enlarged plan view of an area AA' shown in FIG. 4.

FIG. 13 is an enlarged plan view of an area AA' shown in FIG. 4 according to another alternative embodiment.

Each of the pattern parts PP-5 and PP-6 of FIGS. 12A and 12B may include a plurality of patterns PPS-3 as shown in FIG. 13. The plurality of patterns PPS-3 may have an island form and may be arranged along a first direction DR1 and a second direction DR2. Accordingly, even if cracks of the pattern parts PP-5 and PP-6 formed of an inorganic matter occur, crack propagation may be reduced.

The damage by heat generated during a process for cutting a cutting area CA through a laser cutting process may be reduced by the pattern parts PP-5 and PP-6. In such an embodiment, as the pattern parts PP-5 and PP-6 are arranged spaced along a bending direction of the bending part BD-P, cracks by bending in the pattern parts PP-5 and PP-6 may be reduced.

In an embodiment, the pattern parts PP-5 and PP-6 may include the plurality of patterns PPS-3 as shown in FIG. 13, but the invention is not limited thereto. In one alternative exemplary embodiment, for example, each of the pattern parts PP-5 and PP-6 may have one of shapes of the patterns shown in FIGS. 9A to 9C.

Figure 14:
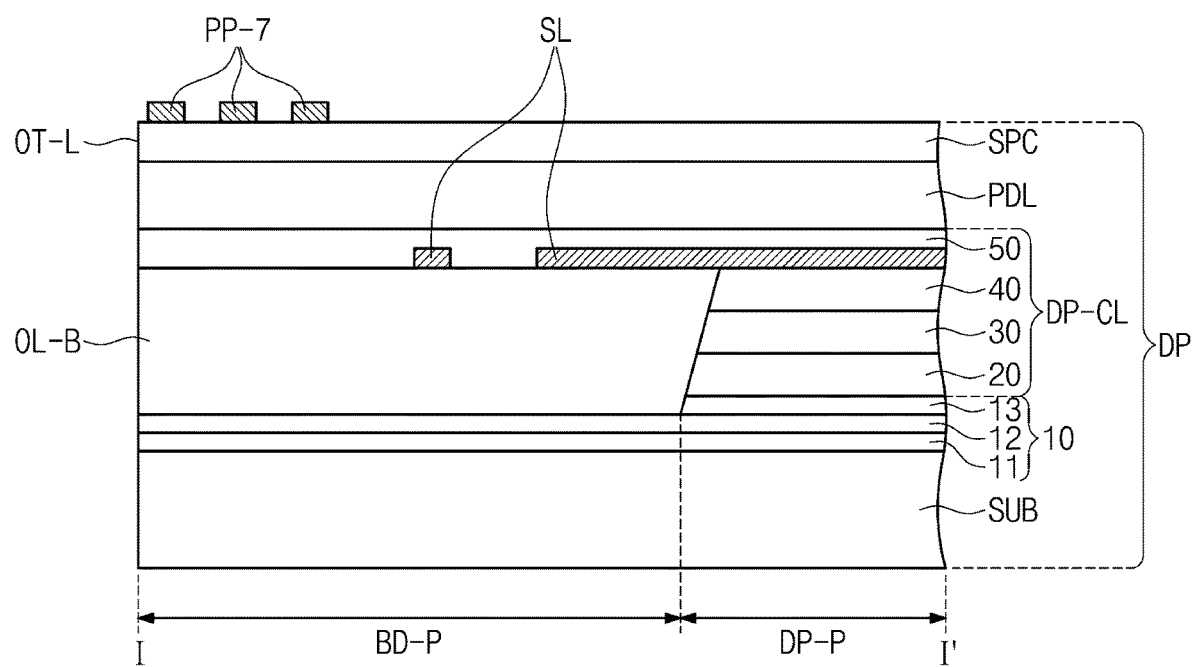
FIG. 14 is a cross-sectional view taken along line I-I' shown in FIG. 4 according to another alternative embodiment of the invention.

FIG. 14 is a cross-sectional view taken along line I-I' shown in FIG. 4 according to another alternative embodiment.

Referring to FIGS. 6 and 14, a pattern part PP-7 may be disposed on a display panel DP. In an embodiment, as shown in FIG. 14, the pattern part PP-7 is disposed on a spacer SPC, but the position of the pattern part PP-7 may vary based on a structure/design of the display panel DP. In one exemplary embodiment, for example, in the display panel DP having a structure where the spacer SPC is omitted or the spacer SPC is not formed at the bending part BD-P, the pattern part PP-7 may be disposed on a pixel definition layer PDL. Alternative, in the display panel DP having a structure where the pixel definition layer PDL and the spacer SPC are not formed at the bending part BD-P, the pattern part PP-7 may be disposed on a pixel definition layer PDL.

The pattern part PP-7 may include at least one of layers constituting a buffer layer BF and a touch detection unit TS.

In one exemplary embodiment, for example, the pattern part PP-7 may be manufactured through a same process as the buffer layer BF. The pattern part PP-7 may include or be formed of a same material and may have a same layer-stacked structure as the buffer layer BF. In such an embodiment, the pattern part PP-7 may include an inorganic matter.

The pattern part PP-7 may include or be formed of a same material and have a same layer-stacked structure as at least one of a first conductive layer TS-CL1, a second conductive layer TS-CL2, a first touch insulation layer TS-IL1, and a second touch insulation layer TS-IL2 of the touch detection unit TS. In an embodiment, where the pattern part PP-7 is formed of a same material as the first conductive layer TS-CL1 or the second conductive layer TS-CL2, the pattern part PP-7 may include at least one of ITO, IZO, zinc oxide (ZnO), ITZO, PEDOT, metal nanowire, graphene, molybdenum, silver, titanium, copper, aluminum and an ally thereof. In an embodiment, where the pattern part PP-7 is formed of a same material as the first touch insulation layer TS-IL1 and the second touch insulation layer TS-IL2, the pattern part PP-7 may include an inorganic matter.

According to an embodiment of the invention, a pattern part may have at least one feature of the pattern part PP of FIG. 8, the pattern part PP-3 of FIG. 10, the pattern part PP-4 of FIG. 11, the pattern part PP-5 of FIG. 12A, the pattern part PP-6 of FIG. 12B, and the pattern part PP-7 of FIG. 14.

Figure 15:
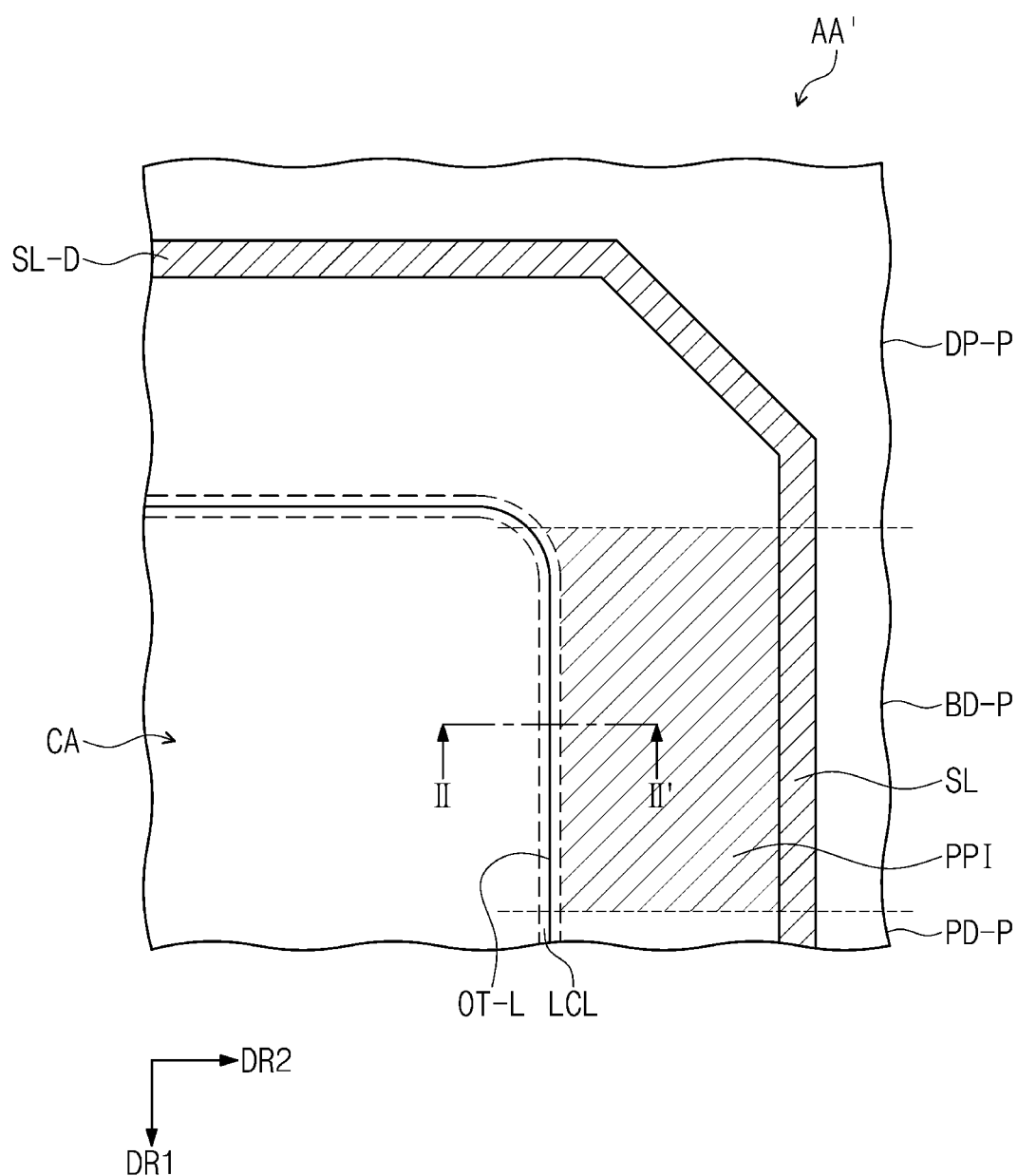
FIG. 15 is an enlarged plan view of an area AA' shown in FIG. 4 according to another alternative embodiment of the invention.

FIG. 15 is an enlarged plan view of an area AA' shown in FIG. 4 according to another alternative embodiment. More particularly, FIG. 15 illustrates the area AA' in a state where a cut area CA is not cut out.

An area where each of a display part DP-P, a bending part BD-P and a pad part PD-P contacts the area to be cut CA is shown by a dotted line as a laser cutting area LCL to which a laser is irradiated to cut. By irradiating laser to the laser cutting area LCL, the display part DP-P, the bending part BD-P, the pad part PD-P, and the cut area CA are defined, a side end OT-L of the bending part BD-P may be formed by cutting the cut area CA.

A pattern part for preventing damage by heat occurring when the cut area CA is cut may be disposed in a protection area PPI between the side end OT-L of the bending part BD-P and the wire SL. Accordingly, a contraction by a heat of the bending part BD-P may be effectively prevented by the pattern part disposed in the protection area PPI. As a result, when the bending part BD-P is bent, a stress applied to the bending part BD-P may be effectively prevented from being increased.

Figure 16:
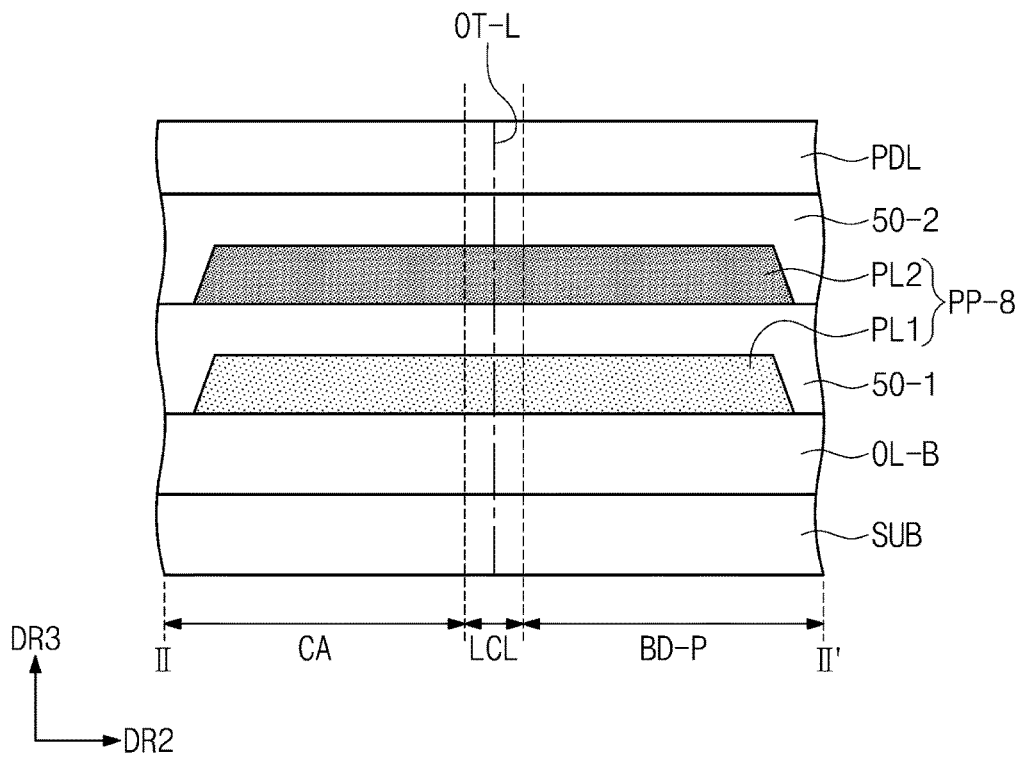
FIG. 16 is a cross-sectional view taken along line II-II' shown in FIG. 15 according to an embodiment.

FIG. 16 is a cross-sectional view taken along line II-II' shown in FIG. 15 according to an embodiment.

Referring to FIGS. 6 and 16, a pattern part PP-8 may overlap the side end OT-L without being spaced from the side end OT-L. Since FIG. 16 is a cross-sectional view before a cut area CA is cut, the side end OT-L is not formed yet. Accordingly, FIG. 16 illustrates the side end OT-L in a dot-dash line.

A pattern part PP-8 may include a first pattern layer PL1 and a second pattern layer PL2. The second pattern layer PL2 may be disposed on the first pattern layer PL1. The first pattern layer PL1 may be disposed on a first organic layer OL-B, a second organic layer 50-1 may be disposed between the first pattern layer PL1 and the second pattern layer PL2, and a third organic layer 50-2 may be disposed on the second pattern layer PL2.

The first pattern layer PL1 and the second pattern layer PL2 may include a metallic material. In one exemplary embodiment, for example, the first pattern layer PL1 and the second pattern layer PL2 may include a same material as the first input electrode SE1 and the first output electrode DE1. In one exemplary embodiment, for example, the first pattern layer PL1 and the second pattern layer PL2 may include at least one of molybdenum, silver, titanium, copper, aluminum, and an alloy thereof, but not being limited thereto.

In an embodiment, as shown in FIG. 6, the first input electrode SE1 and the first output electrode DE1 are disposed between the third insulation layer 40 and the fourth insulation layer 50. In an alternative embodiment, the first input electrode SE1 and the first output electrode DE1 may include a plurality of layers. In such an embodiment, each of the first input electrode SE1 and the first output electrode DE1 may include a first sub electrode layer and a second sub electrode layer disposed on the first sub electrode layer, and the fourth insulation layer 50 may include a second organic layer 50-1 disposed between the first sub electrode layer and the second sub electrode layer and a third organic layer 50-2 disposed on the second organic layer 50-1 and covering the second sub electrode layer. The first pattern layer PL1 may be manufactured through a same photolithography process as the first sub electrode layer. In such an embodiment, the first pattern layer PL1 may include or be formed of a same material and have a same layer-stacked structure as the first sub electrode layer. The second pattern layer PL2 may be manufactured through a same photolithography process as the second sub electrode layer. In such an embodiment, the second pattern layer PL2 may include or be formed of a same material and have a same layer-stacked structure as the second sub electrode layer. However the invention is not limited thereto. In one alternative exemplary embodiment, for example, the first pattern layer PL1 and the second pattern layer PL2 may include a material having a higher thermal conductivity than an organic layer.

A heat occurring when the cut area CA is cut out by using laser is transferred through the first pattern layer PL1 and the second pattern layer PL2. In an embodiment, heat is effectively prevented from being concentrated on an area adjacent to the laser cutting area LCL by the first pattern layer PL1 and the second pattern layer PL2, such that the heat deformation of the bending part BD-P may be reduced. As a result, a bending stress occurring when the bending part BD-P is bent may be reduced.

Figure 17:
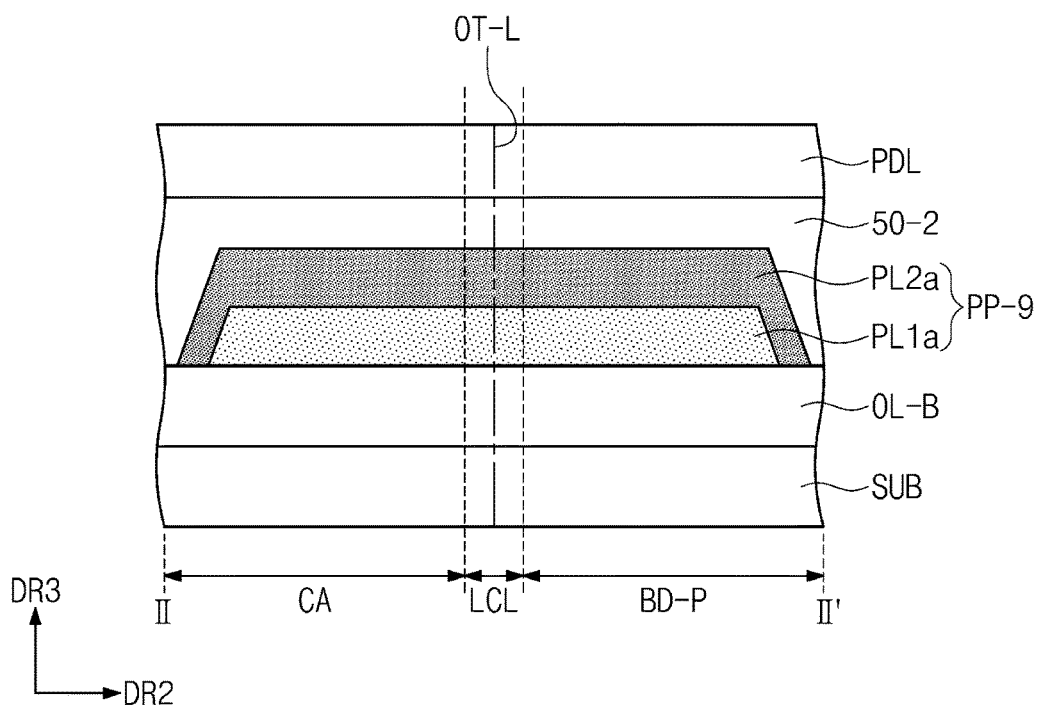
FIG. 17 is a cross-sectional view taken along line II-II' shown in FIG. 15 according to an alternative embodiment.

FIG. 17 is a cross-sectional view taken along line II-II' shown in FIG. 15 according to an alternative embodiment.

Referring to FIG. 17, a pattern part PP-9 may include a first pattern layer PL1a and a second pattern layer PL2a. The second pattern layer PL2a is disposed on the first pattern layer PL1a. The first pattern layer PL1a and the second pattern layer PL2a may contact each other. Referring to FIG. 16, the second organic layer 50-1 (see FIG. 16) may not be disposed between the first pattern layer PL1a and the second pattern layer PL2a Since the pattern part PP-9 includes both the first pattern layer PL1a and the second pattern layer PL2a, heat transfer efficiency may be higher compared to a case that the pattern part PP-9 includes only one of the first pattern layer PL1a and the second pattern layer PL2a. The heat transfer efficiency may be improved as a thickness of the first pattern layer PL1a and the second pattern layer PL2a is thicker. Therefore, in such an embodiment, a thickness of the first pattern layer PL1a and the second pattern layer PL2a may be determined in consideration of heat transfer efficiency and flexibility.

Figure 18:
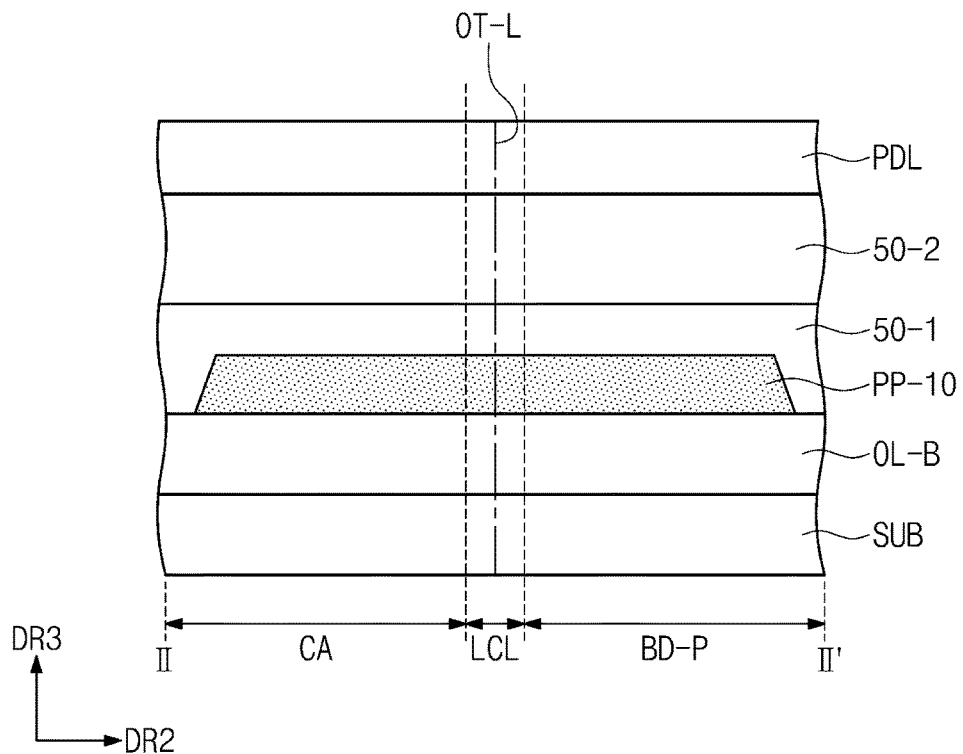
FIG. 18 is a cross-sectional view taken along line II-II' shown in FIG. 15 according to another alternative embodiment.
Figure 19:
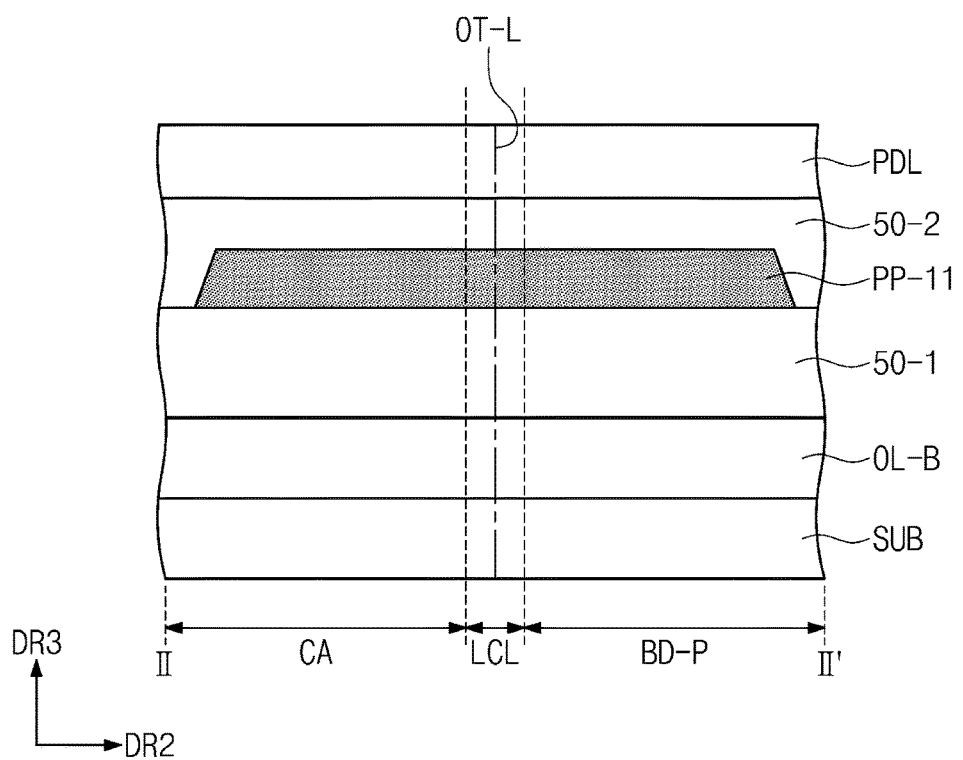
FIG. 19 is a cross-sectional view taken along line II-II' shown in FIG. 15 according to another alternative embodiment.

FIG. 18 is a cross-sectional view taken along line II-II' shown in FIG. 15 according to another alternative embodiment. FIG. 19 is a cross-sectional view taken along line II-II' shown in FIG. 15 according to another alternative embodiment.

Referring to FIGS. 18 and 19, each of pattern parts PP-10 and PP-11 may include a single pattern layer. The pattern part PP-10 of FIG. 18 may include only the first pattern layer PL1 (see FIG. 16), and the pattern part PP-11 of FIG. 19 may include only the second pattern layer PL2 (see FIG. 16). In terms of heat conductivity, the pattern part PP-8 of FIG. 16 may be advantageous than the pattern parts PP-10 and PP-11 of FIGS. 18 and 19, and in terms of flexibility, the pattern parts PP-10 and PP-11 of FIGS may be advantageous than the pattern part PP-8 of FIG. 16.

FIGS. 20 to 23 are cross-sectional views taken along line II-II' shown in FIG. 15 according to alternative embodiments.

In an alternative embodiment, as shown in FIGS. 20 to 23, pattern parts PP-12, PP-13, PP-14 or PP-15 may not overlap the laser cutting area LCL.

Figure 20:
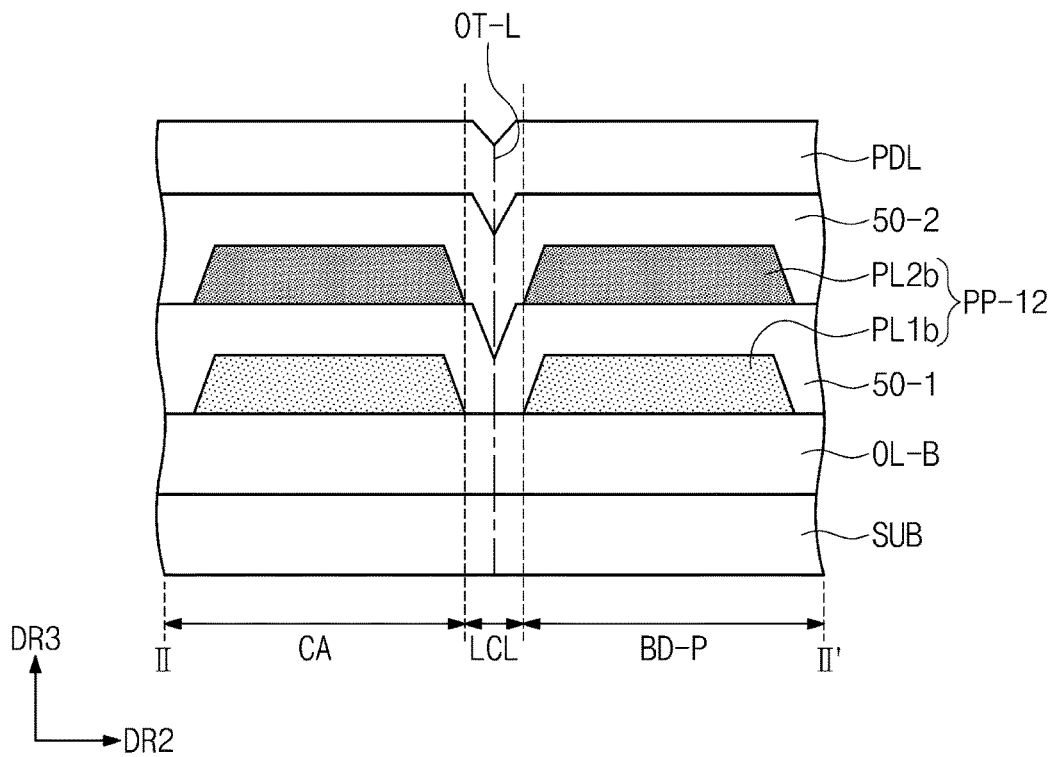
FIGS. 20 to 23 are cross-sectional views taken along line II-II' shown in FIG. 15 according to alternative embodiments of the invention.

Referring to FIG. 20, the pattern part PP-12 includes a first pattern layer PL1b and a second pattern layer PL2b. Each of the first pattern layer PL1b and the second pattern layer PL2b may not be disposed in an area overlapping the laser cutting area LCL. Accordingly, a thickness of the laser cutting area LCL may be reduced and since the first pattern layer PL1b and the second pattern layer PL2b including a metallic material is not disposed in the laser cutting area LCL, a cutting process may be easily performed. In such an embodiment, cracks occurring on the first pattern layer PL1 and the second pattern layer PL2 may be reduced during a laser cutting process.

Figure 21:
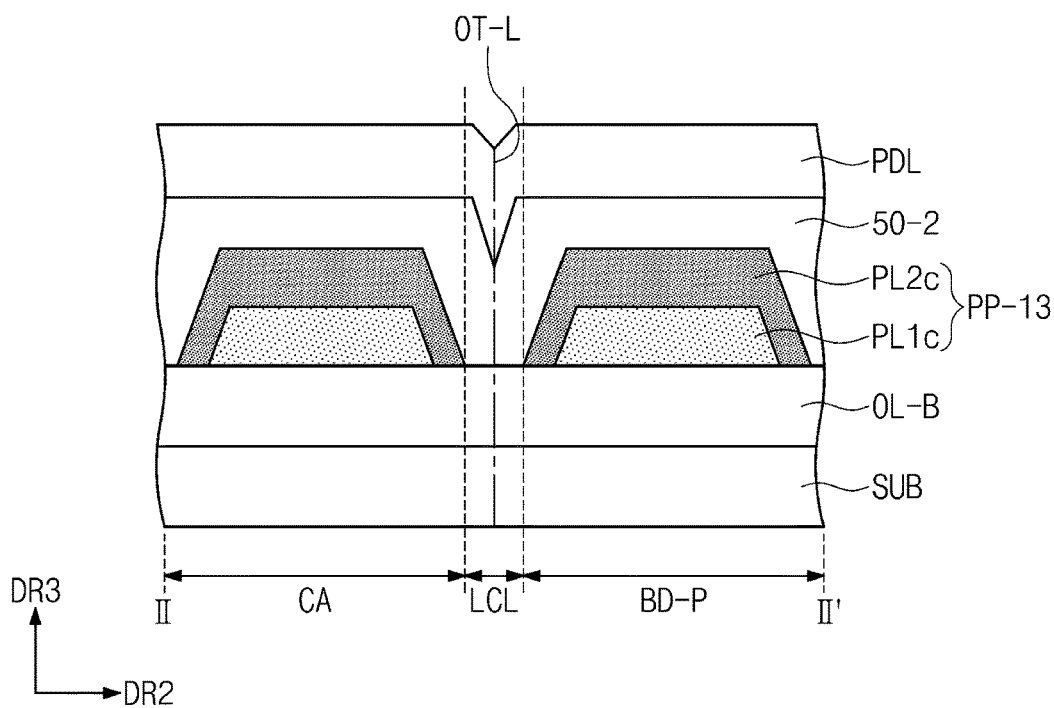

Referring to FIG. 21, the pattern part PP-13 includes a first pattern layer PL1c and a second pattern layer PL2c. The first pattern layer PL1c and the second pattern layer PL2c may contact each other. Each of the first pattern layer PL1c and the second pattern layer PL2c may not be disposed in an area overlapping the laser cutting area LCL. Although it is shown in FIG. 21 that the second pattern layer PL2c has a form that covers the both ends of the first pattern layer PL1c, the invention is not limited thereto. Accordingly to an alternative embodiment of the invention, the second pattern layer PL2c may have a structure stacked on the first pattern layer PL1c and both ends of the first pattern layer PL1c may contact the third organic layer 50-2.

Figure 22:
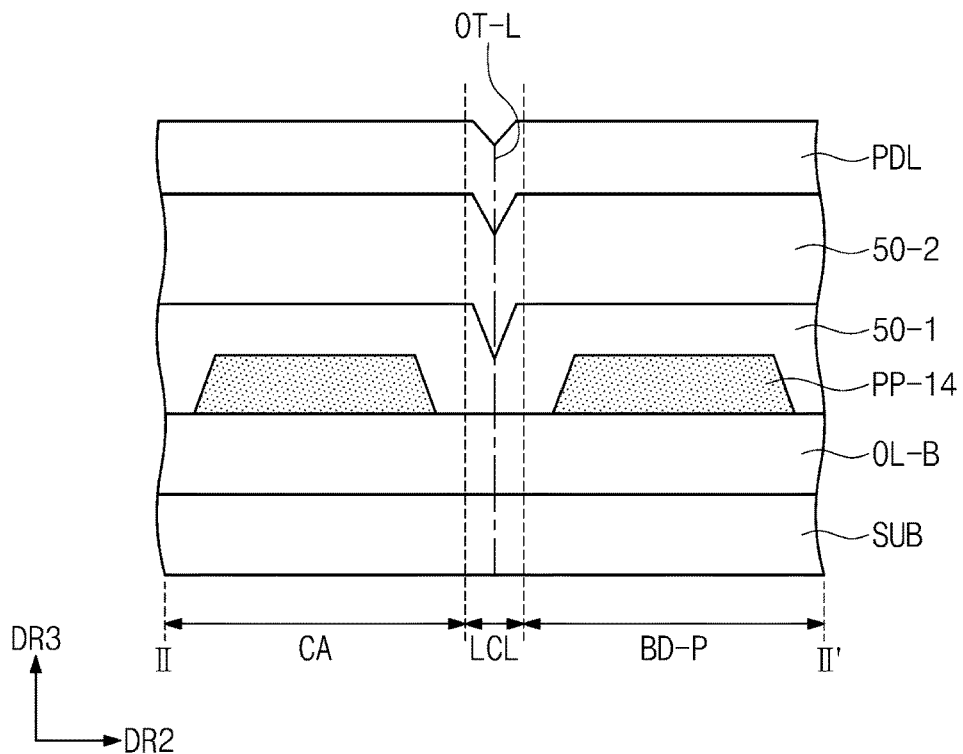
Figure 23:
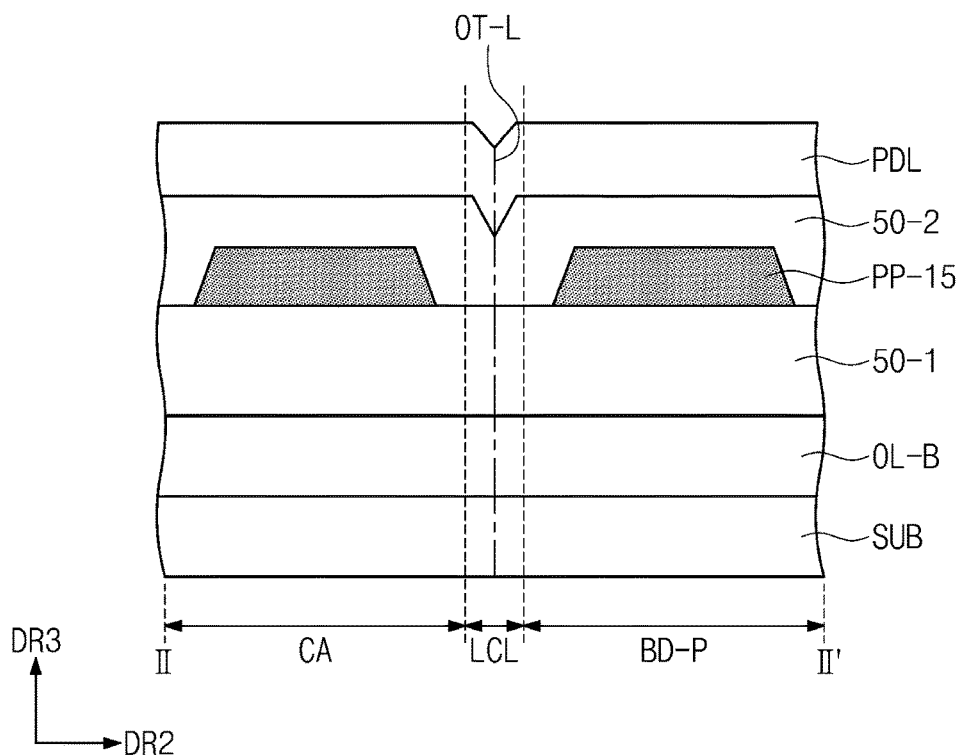

Referring to FIGS. 22 and 23, each of pattern parts PP-14 and PP-15 may include a single pattern layer. The single pattern layer may not be disposed in an area overlapping the laser cutting area LCL.

According to an embodiment of the invention, a pattern part is disposed in an area adjacent to an outline of a bending part. Because of the pattern part, a heat damage of the bending part caused from a cutting process may be reduced and a deformation of the bending part may be reduced. As a result, a bending stress occurring when the bending part is bent may be reduced.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display device comprising:
a display part which displays an image;
a pad part electrically connected to the display part; and
a bending part disposed between the display part and the pad part to connect the display part and the pad part, wherein the bending part has a side end extending from the display part to the pad part, wherein the bending part comprises:
- a base layer;
- a plurality of wires disposed on the base layer and electrically connected to the display part and the pad part; and
- a pattern part disposed on the base layer between the side end and a wire of the plurality of wires closest to the side end and spaced from the wire, when viewed from a plan view in a thickness direction of the base layer, wherein the base layer of the bending part is integrally formed with a base layer of the display part as a single unitary and indivisible unit.

2. The display device of claim 1, wherein the pattern part overlaps the side end when viewed from the plan view.

3. The display device of claim 1, wherein the pattern part is spaced from the side end when viewed from the plan view.

4. The display device of claim 1, wherein
the side end extends along a first direction, and
the pattern part comprises a pattern extending along the first direction.

5. The display device of claim 4, wherein
the pattern is provided in plurality, and
the plurality of patterns is arranged along a second direction intersecting the first direction.

6. The display device of claim 1, wherein
the side end extends along a first direction;
the pattern part comprises a plurality of patterns; and
the plurality of patterns is arranged in a matrix form along the first direction and a second direction intersecting the first direction.

7. The display device of claim 1, wherein
the side end extends along a first direction,
the pattern part comprises a plurality of first patterns arranged along the first direction and a plurality of second patterns arranged along the first direction,
the first patterns and the second patterns are alternately arranged along a second direction intersecting the first direction, and
an imaginary line passing through a center point of each of the first patterns and extending along the second direction is spaced apart a center point of each of the second patterns.

8. The display device of claim 1, wherein
the bending part comprises:
- a first organic layer disposed on the base layer; and
- a second organic layer disposed on the first organic layer, wherein the pattern part is disposed between the first organic layer and the second organic layer.

9. The display device of claim 8, wherein
the pattern part comprises a first pattern layer and a second pattern layer disposed on the first pattern layer; and
the bending part further comprises a third organic layer disposed between the first pattern layer and the second pattern layer.

10. The display device of claim 8, wherein
the pattern part further comprises a first pattern layer and a second pattern layer disposed on the first pattern layer, and
the first pattern layer and the second pattern layer contact each other.

11. The display device of claim 1, wherein the display part comprises:
- a driving transistor including a semiconductor pattern, a control electrode, an input electrode and an output electrode;
- an anode electrically connected to the output electrode; and
- a plurality of insulation layers, each of which is disposed between the semiconductor pattern, the control electrode, and the input and output electrodes, wherein each of the plurality of insulation layers comprises an inorganic matter.

12. The display device of claim 11, wherein the pattern part comprises a same material as the control electrode.

13. The display device of claim 11, wherein the pattern part comprises a same material as the input electrode and the output electrode.

14. The display device of claim 11, wherein the pattern part comprises a same material as the anode.

15. The display device of claim 11, wherein the pattern part comprises a same material as each of the plurality of insulation layers.

16. The display device of claim 11, further comprising:
- a buffer layer disposed on the display part; and
- a touch detection unit disposed on the buffer layer, wherein the pattern part comprises a same material as the buffer layer or the touch detection unit.

17. The display device of claim 16, wherein
the pattern part comprises a plurality of pattern layers, and
each of the plurality of pattern layers comprises a same material as at least one of the control electrode, the input electrode, the output electrode, the anode, the plurality of insulation layers, the buffer layer and the touch detection unit.

18. The display device of claim 1, wherein the pattern part comprises an inorganic matter or a metallic material.

19. The display device of claim 1, wherein
the base layer of the bending part is integrally formed with a base layer of the display part as a single unitary and indivisible unit,
the display part, the bending part, and the pad part are sequentially arranged along a first direction;
the display part has a first width parallel to a second direction intersecting the first direction,
the bending part has a second width parallel to the second direction, and
the second width is less than the first width.

20. A display device comprising:
- a display portion which displays an image;
- a pad portion electrically connected to the display portion; and
- a bending portion disposed between the display portion and the pad portion to connect the display portion and the pad portion, wherein the bending portion has a side end extending from the display portion to the pad portion, wherein the bending portion comprises:
- a base layer;
- a plurality of wires disposed on the base layer and electrically connected to the display portion and the pad portion; and
- a pattern portion disposed between the side end and a wire of the plurality of wires closest to the side end and spaced from the wire, when viewed from a plan view in a thickness direction of the base layer, and wherein the base layer, the plurality of wires and the pattern portion are bent toward a bottom surface of the display portion, and
the pad portion is disposed below the display portion.

* * * * *